United States Patent
Rey

(10) Patent No.: US 12,515,773 B2
(45) Date of Patent: Jan. 6, 2026

(54) DEVICE DRIVING THE FLAPPING OF A CARRIER PLANE

(71) Applicant: Francis Rey, Cormolain (FR)

(72) Inventor: Francis Rey, Cormolain (FR)

( * ) Notice: Subject to any disclaimer, the term of this patent is extended or adjusted under 35 U.S.C. 154(b) by 505 days.

(21) Appl. No.: 18/043,417

(22) PCT Filed: Aug. 25, 2021

(86) PCT No.: PCT/EP2021/073475
§ 371 (c)(1),
(2) Date: Feb. 28, 2023

(87) PCT Pub. No.: WO2022/043368
PCT Pub. Date: Mar. 3, 2022

(65) Prior Publication Data
US 2023/0322346 A1 Oct. 12, 2023

(30) Foreign Application Priority Data
Aug. 28, 2020 (FR) ..................... 2008799

(51) Int. Cl.
*B63H 1/34* (2006.01)
*B63H 1/36* (2006.01)

(52) U.S. Cl.
CPC ......... *B63H 1/34* (2013.01); *B63H 2001/346* (2013.01); *B63H 1/36* (2013.01)

(58) Field of Classification Search
CPC .............. B63H 1/30; B63H 1/32; B63H 1/34; B63H 2001/346; B63H 2001/348; B63H 1/36

See application file for complete search history.

(56) References Cited

U.S. PATENT DOCUMENTS

| 5,401,196 A | 3/1995 | Triantafyllou et al. |
| 2011/0255971 A1 | 10/2011 | Goris et al. |
| 2014/0328682 A1 | 11/2014 | Thouret |

FOREIGN PATENT DOCUMENTS

| FR | 1330218 A | 6/1963 |
| FR | 2470875 A1 | 6/1981 |

(Continued)

OTHER PUBLICATIONS

International Search Report issued on Dec. 21, 2021, in corresponding International Application No. PCT/EP2021/073475, 5 pages.

(Continued)

*Primary Examiner* — Andrew Polay
(74) *Attorney, Agent, or Firm* — Maier & Maier, PLLC

(57) ABSTRACT

A device for driving a primary shaft, the device including: a first system including an element for driving movement of a control member along a looped trajectory having two axial components; a second system including an element for pivoting the shaft about its longitudinal axis, actuated by the movement of the member along at least one component of the looped trajectory; a third system including an element for driving movement of the shaft, actuated by the movement of the control member along at least the other component of the looped trajectory, the control member projecting from the plane of the components and engaged with both the driving element for pivoting and for moving of the shaft, the movement of the control member along the looped trajectory generating a pivoting of the shaft in alternating directions and its movement in alternating directions.

21 Claims, 12 Drawing Sheets

(56) References Cited

FOREIGN PATENT DOCUMENTS

| | | |
|---|---|---|
| FR | 2797428 A1 | 2/2001 |
| WO | 1988/010207 A1 | 12/1988 |
| WO | 2002/070890 A1 | 9/2002 |
| WO | 03/062048 A1 | 7/2003 |
| WO | 2004/110859 A1 | 12/2004 |
| WO | 2009/068762 A1 | 6/2009 |
| WO | 2009/074580 A1 | 6/2009 |
| WO | 2014/006603 A1 | 1/2014 |
| WO | 2016/004800 A1 | 1/2016 |
| WO | 2016/067251 A1 | 5/2016 |
| WO | 2017/168359 A1 | 10/2017 |

OTHER PUBLICATIONS

French Search Report issued on May 1, 2021, in corresponding Application No. 2008799, 2 pages.

[Fig. 1-A]
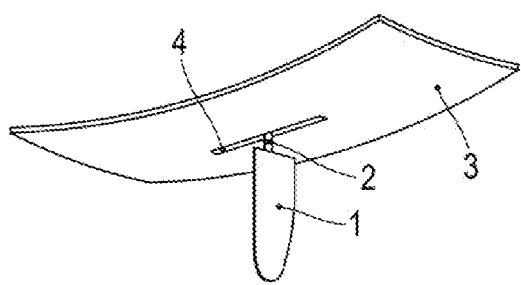
[Fig. 1-B]
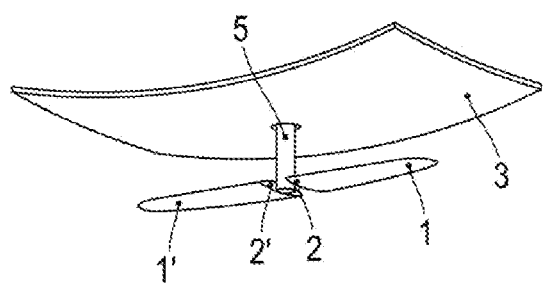
[Fig. 2-A]
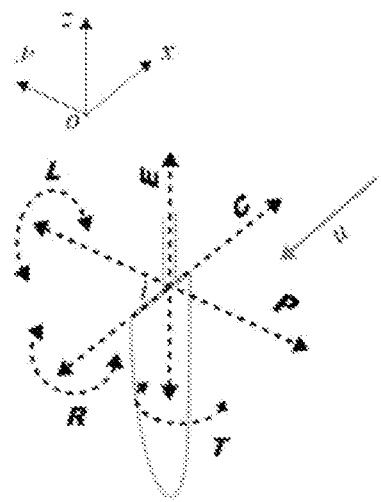
[Fig. 2-B]
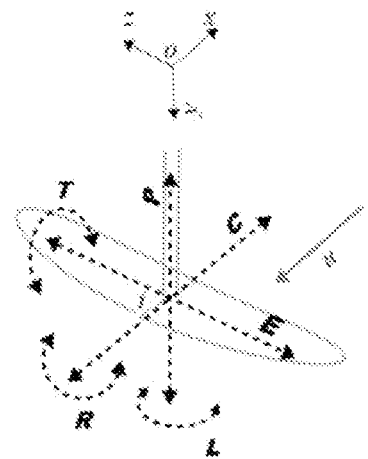

[Fig. 3-A]
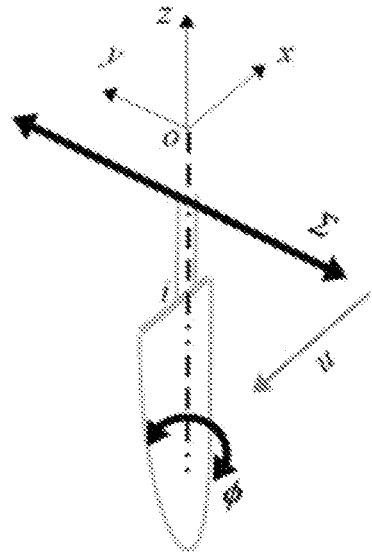
[Fig. 3-B]
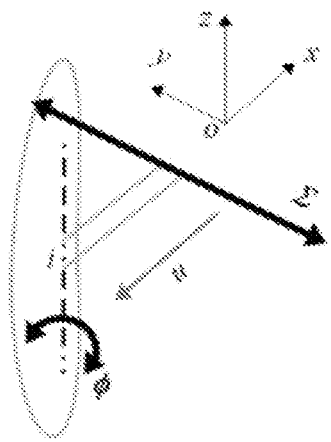
[Fig. 3-C]
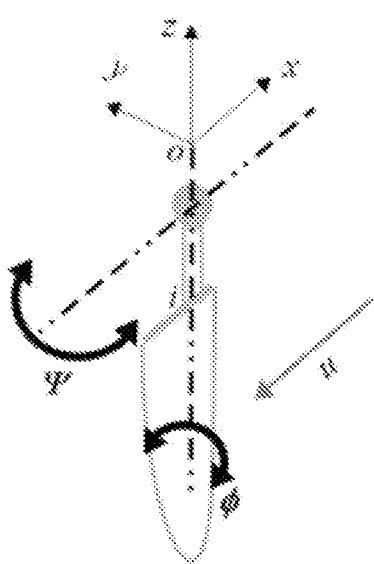
[Fig. 3-D]
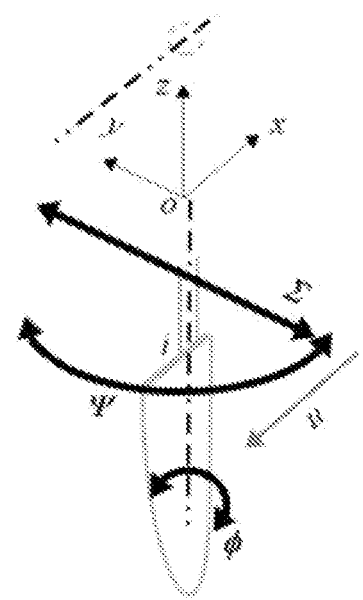

[Fig. 4-A]
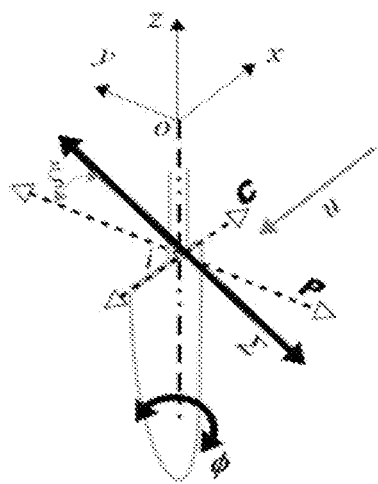
[Fig. 4-B]
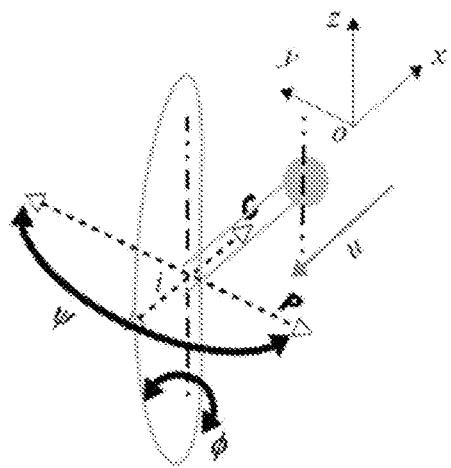
[Fig. 4-C]
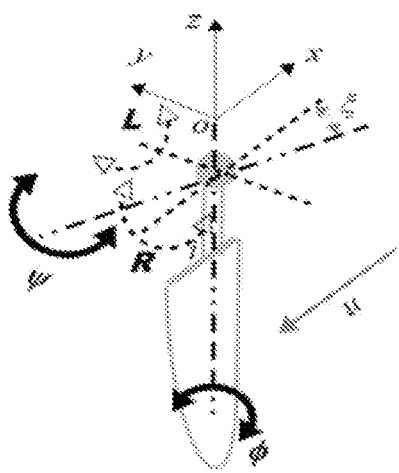
[Fig. 4-D]
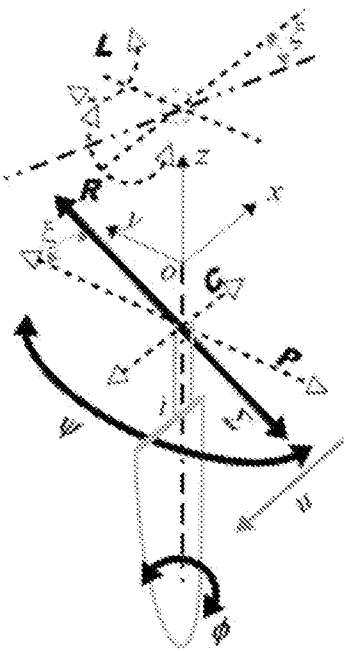

[Fig. 5-A]
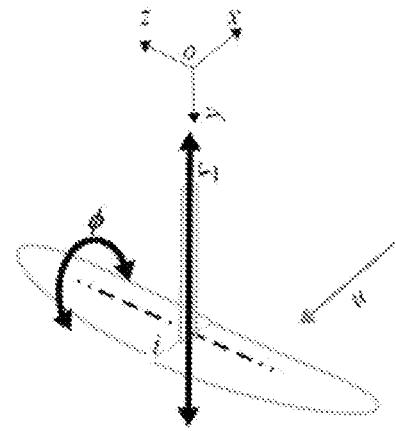
[Fig. 5-B]
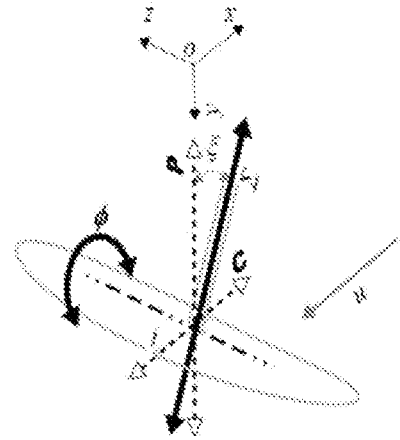
[Fig. 6-A]
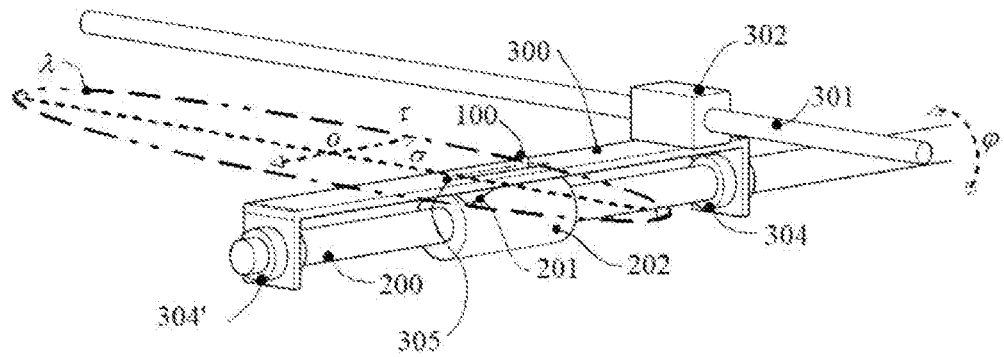
[Fig. 6-B]
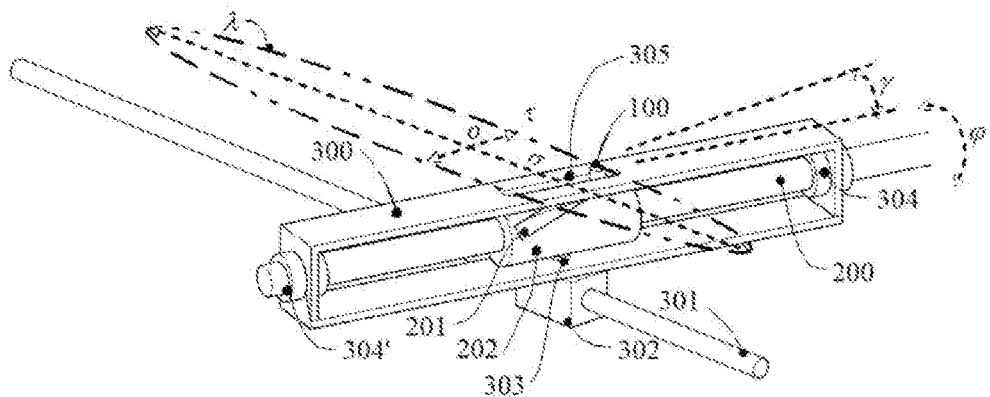

[Fig. 7]
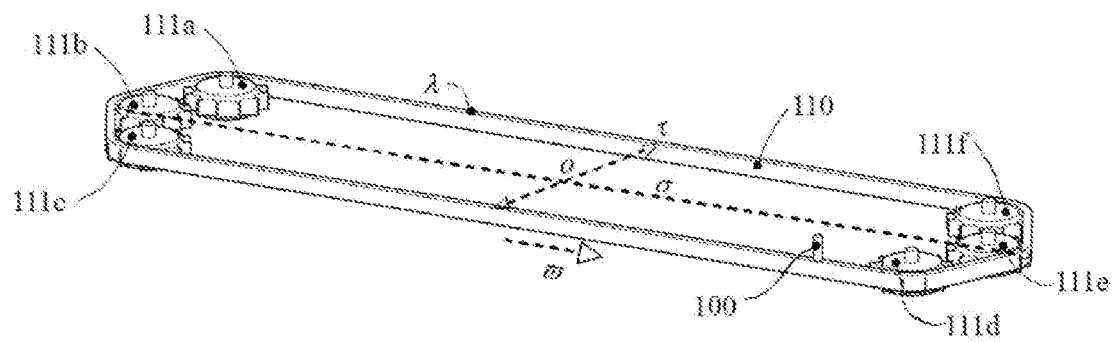
[Fig. 8]
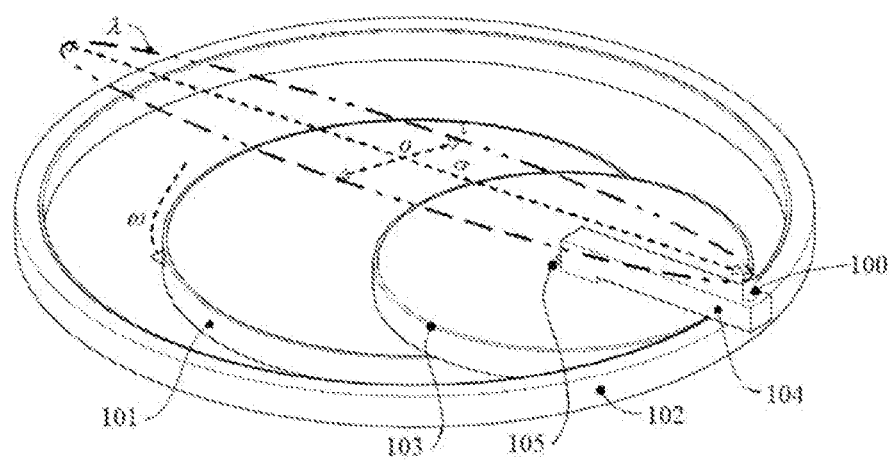
[Fig. 9-A]
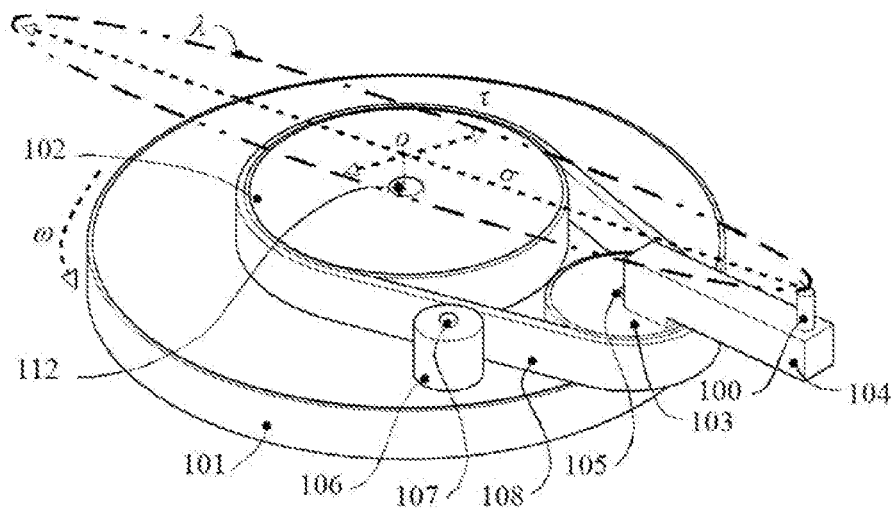

[Fig. 9-B]
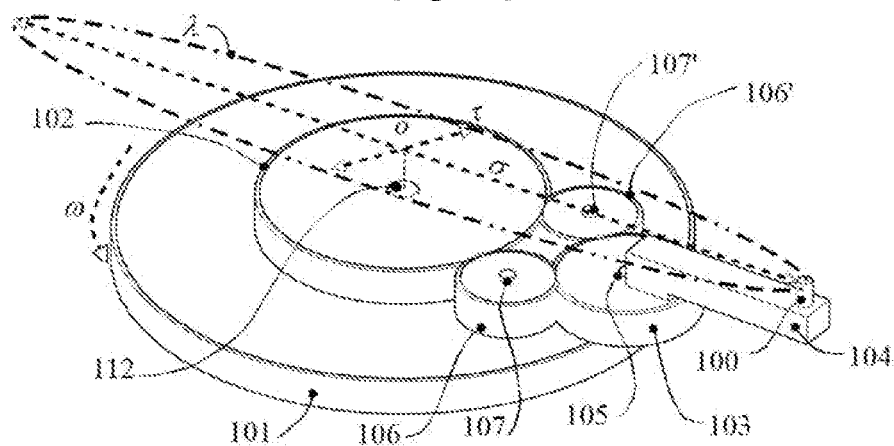
[Fig. 10]
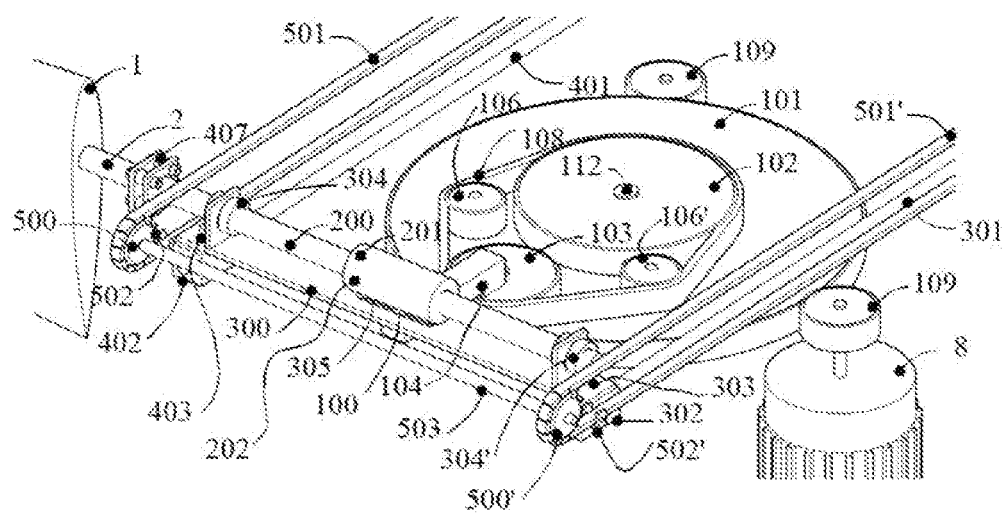
[Fig. 11-A]
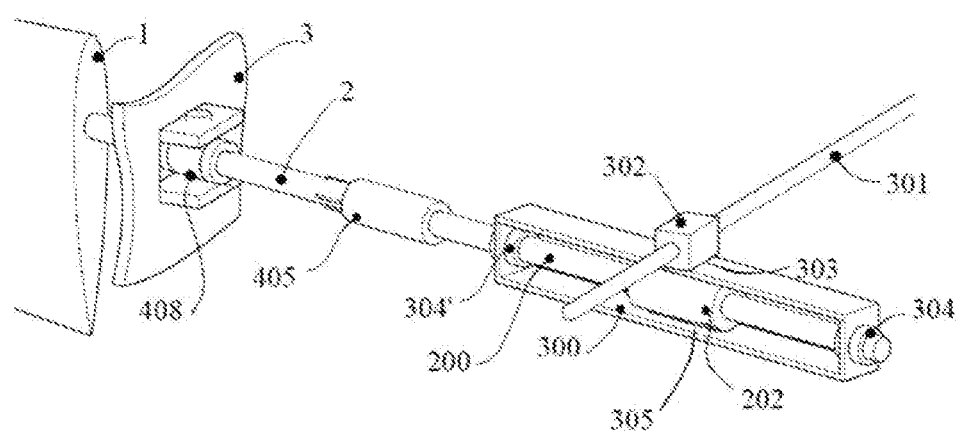

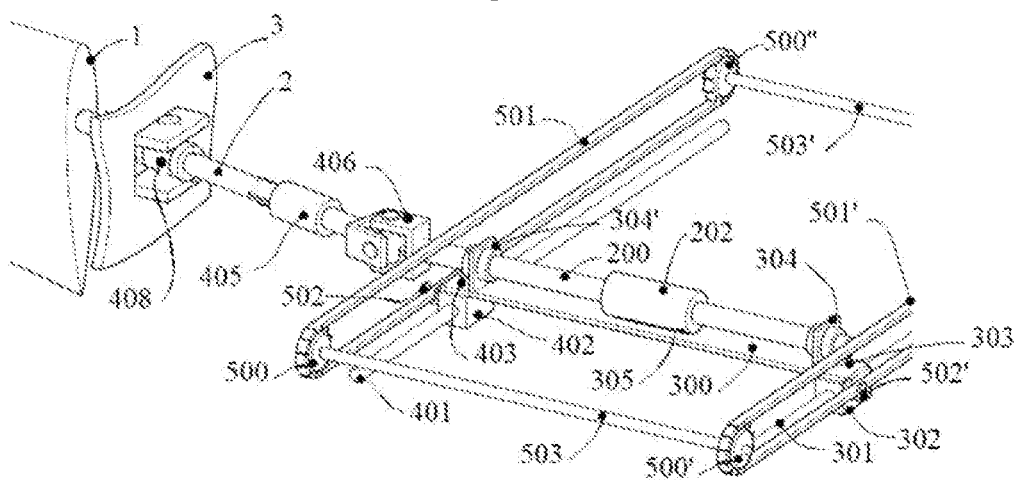
[Fig. 11-B]
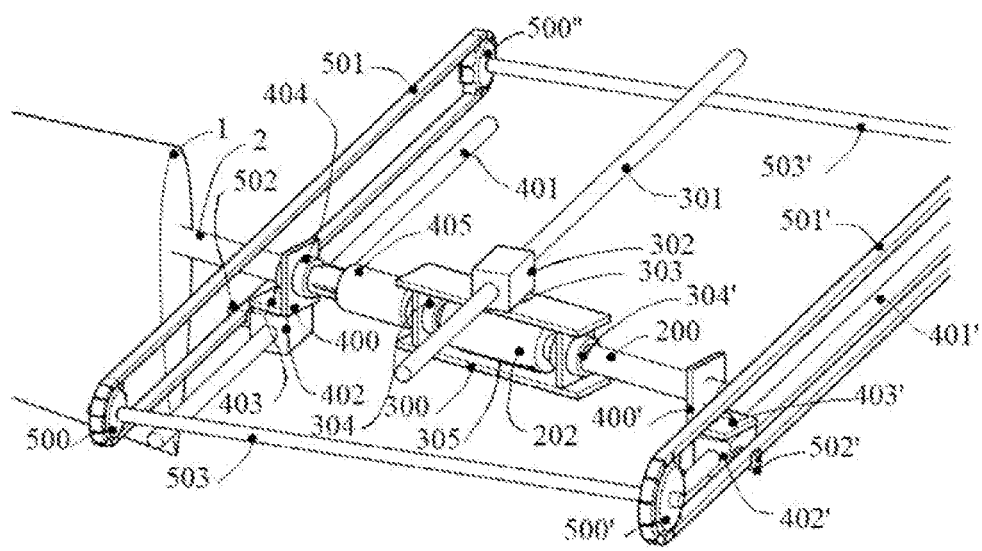
[Fig. 12]

[Fig. 13]
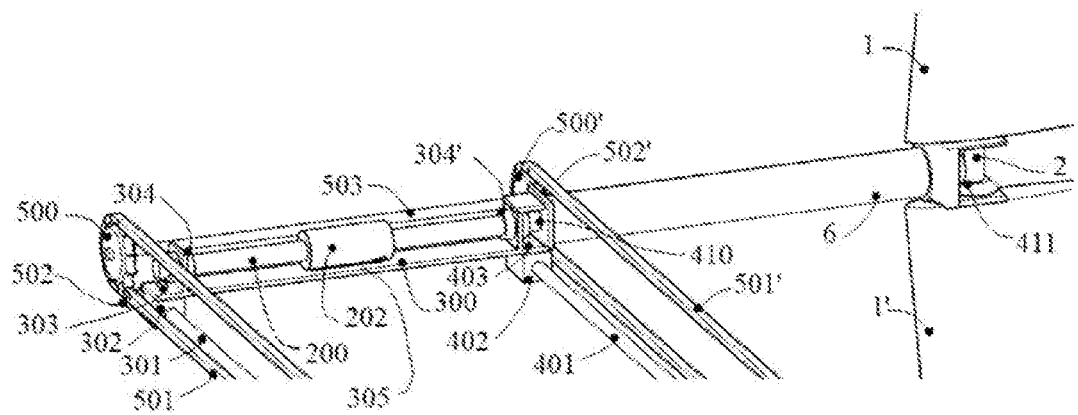
[Fig. 14]
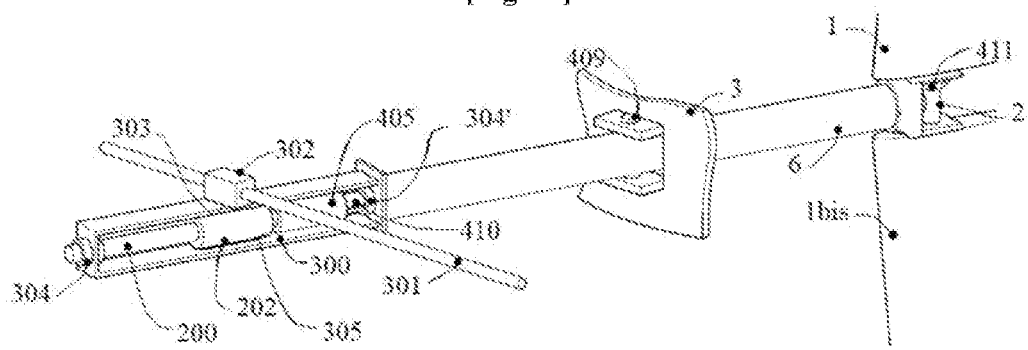
[Fig. 15]
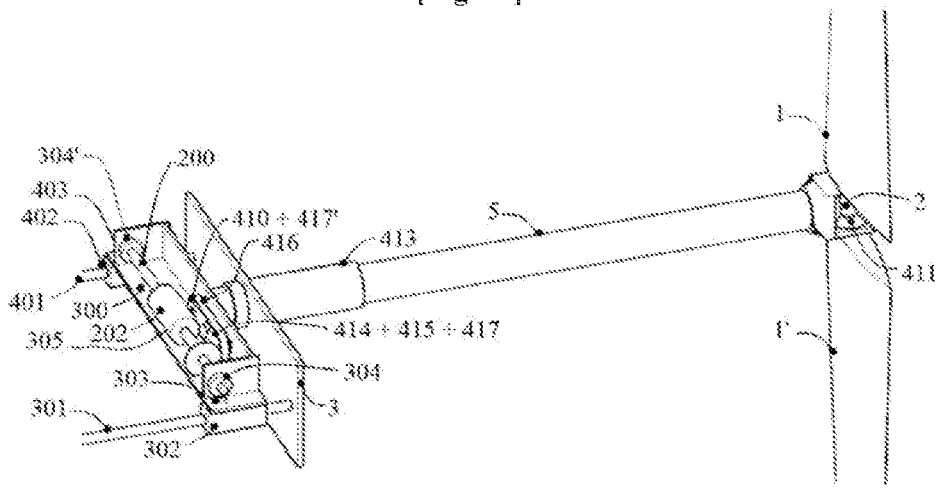

[Fig. 16]
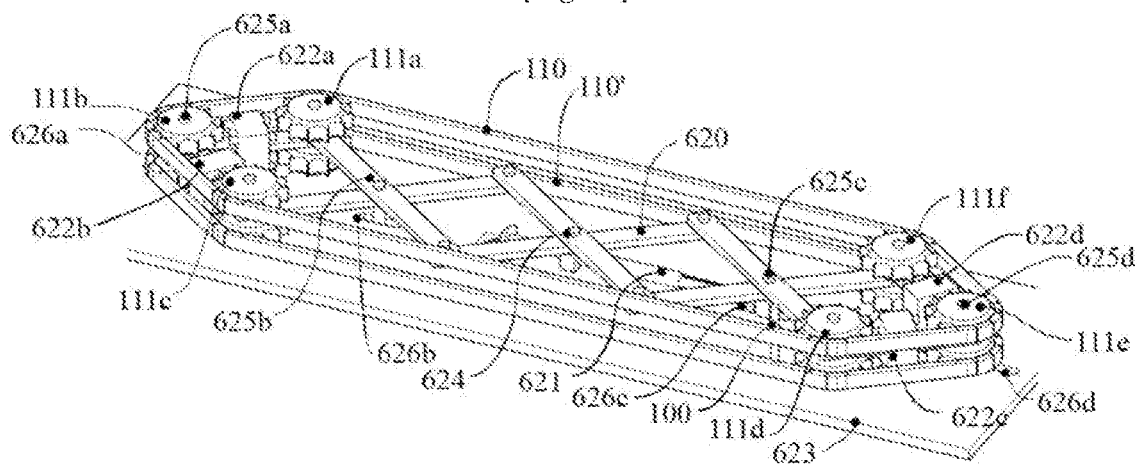
[Fig. 17-A]
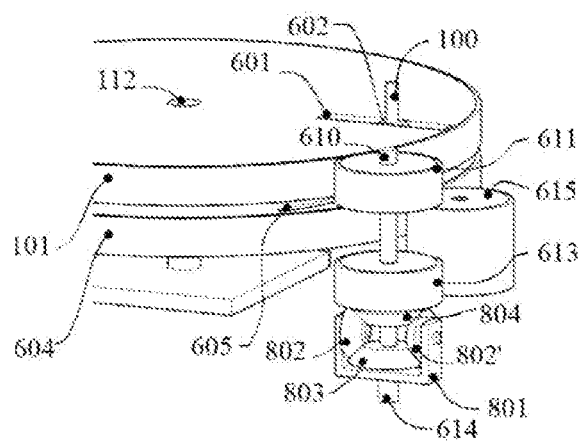
[Fig. 17-B]
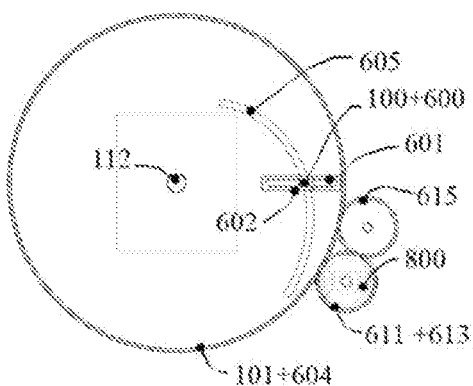
[Fig. 18-A]
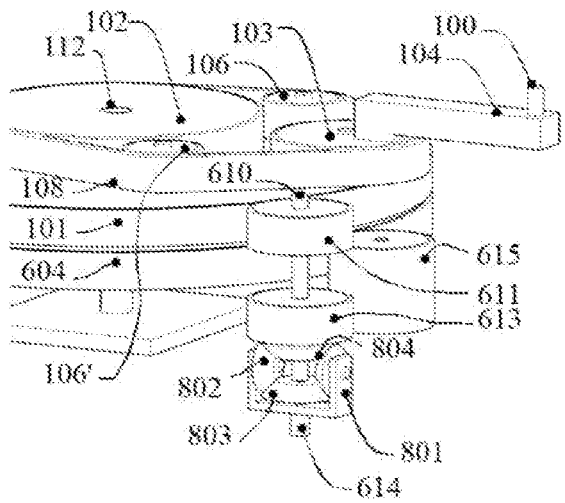
[Fig. 18-B]
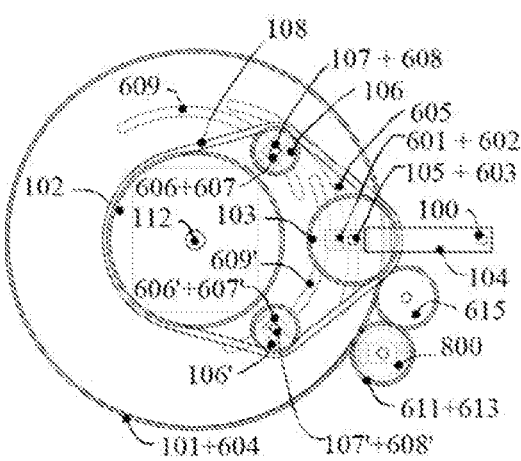

[Fig. 19-A]
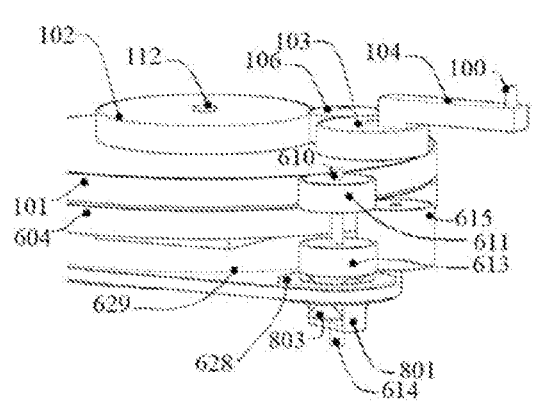
[Fig. 19-B]
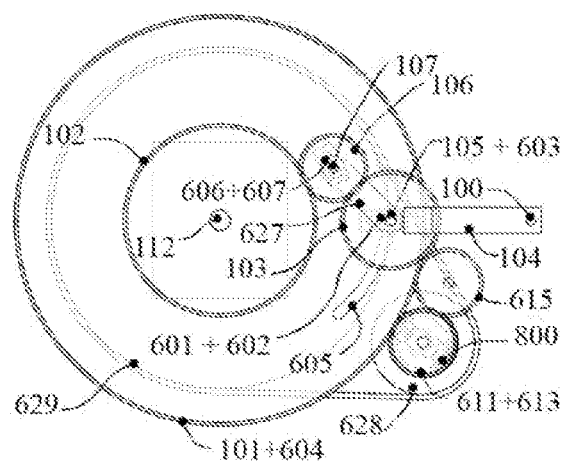
[Fig. 20-A]
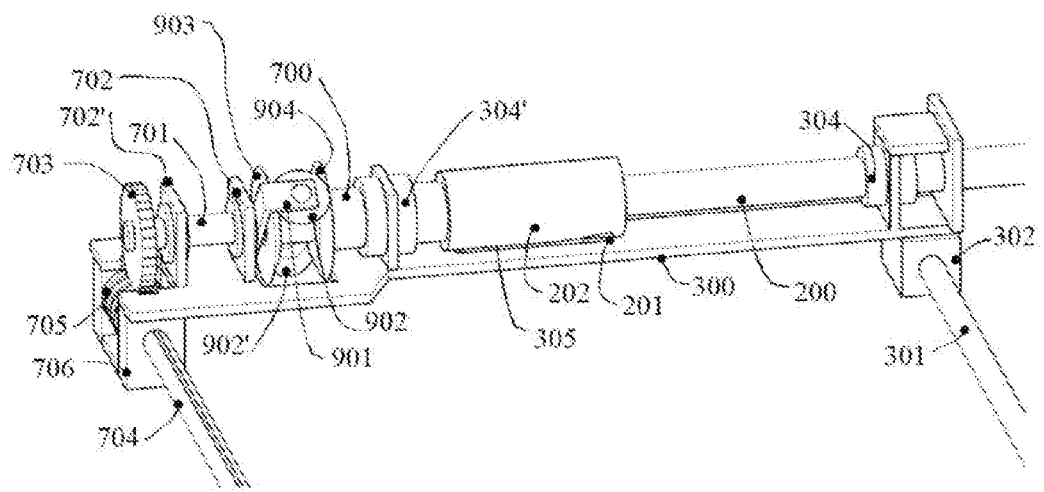
[Fig. 20-B]
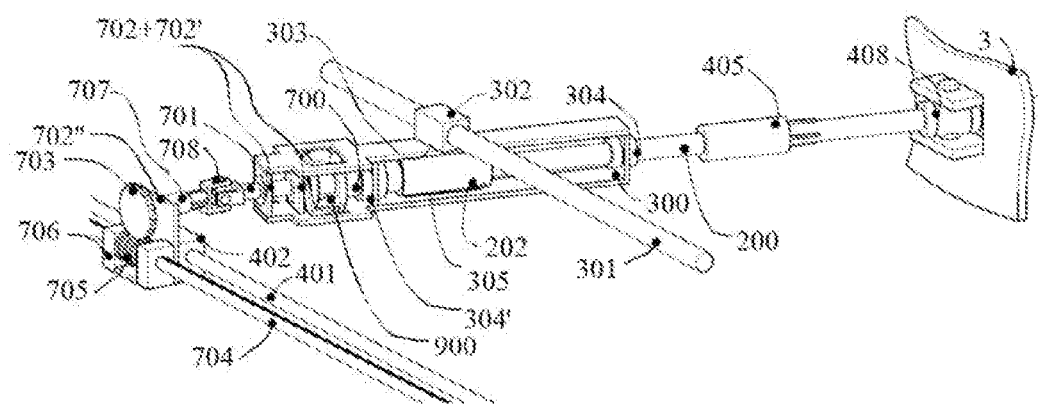

[Fig. 21-A]
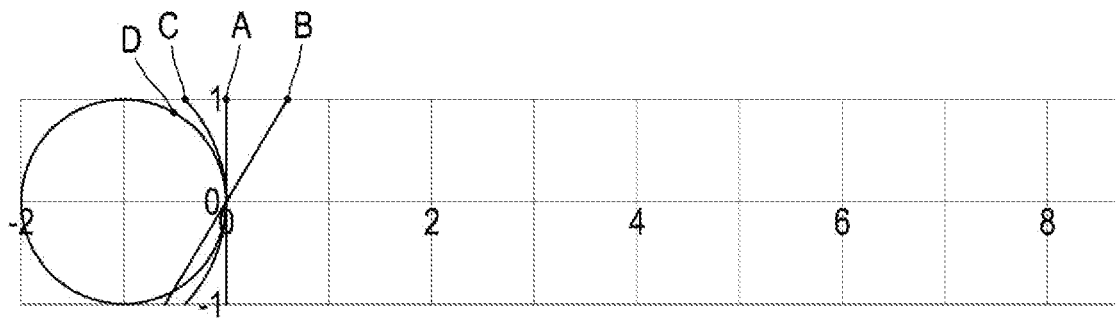
[Fig. 21-B]
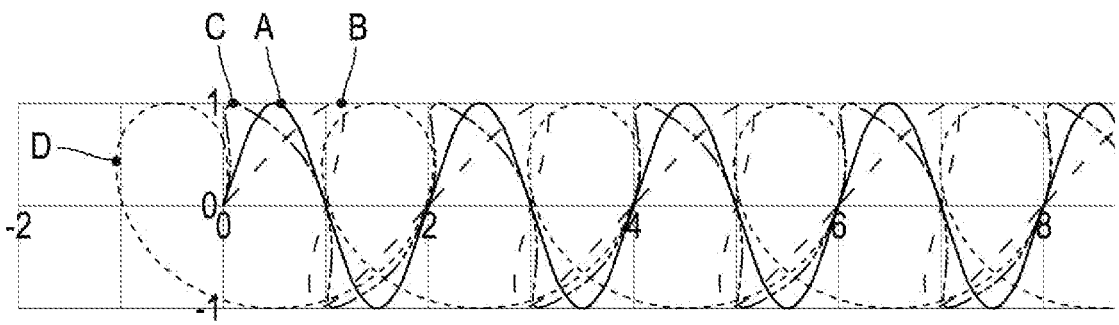
[Fig. 21-C]
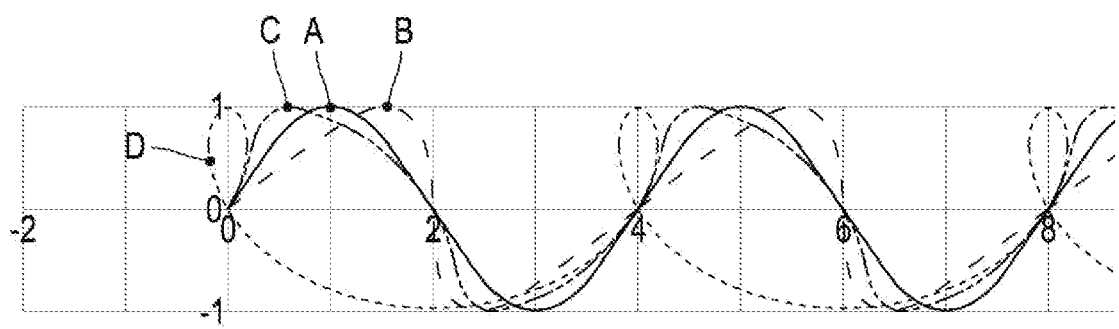
[Fig. 21-D]
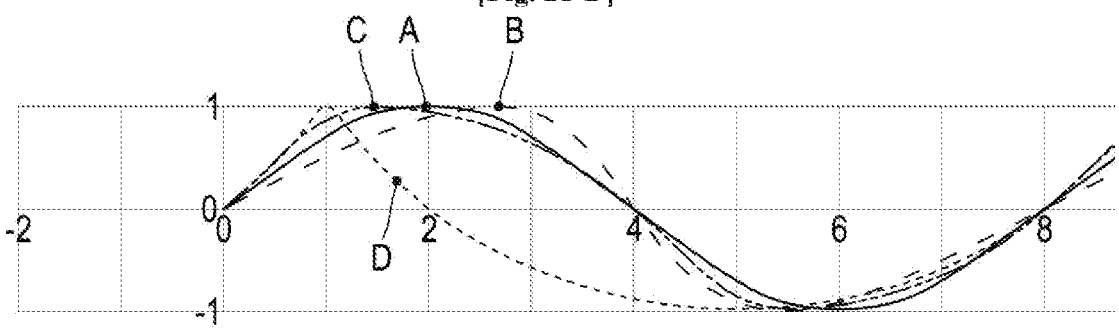

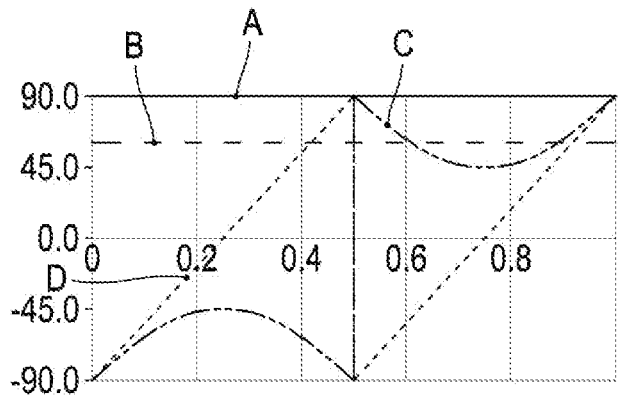
[Fig. 22-A]
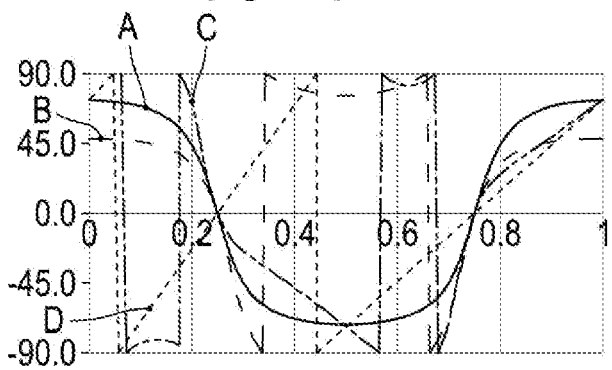
[Fig. 22-B]
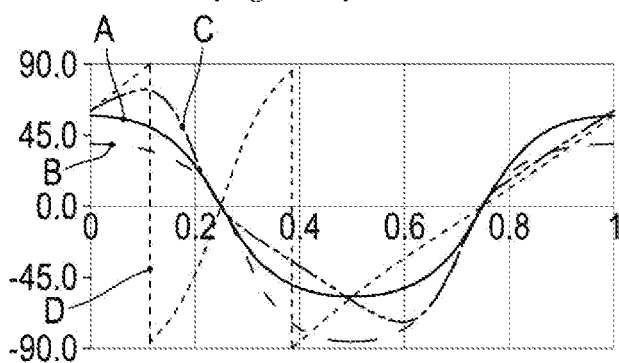
[Fig. 22-C]
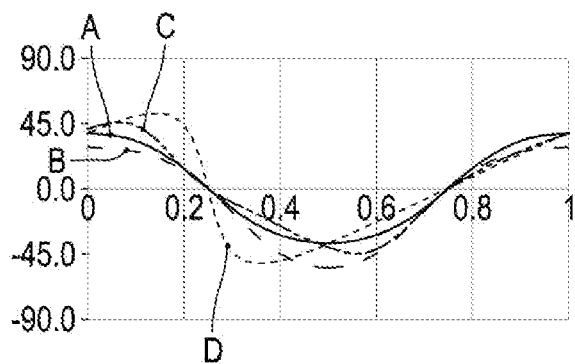
[Fig. 22-D]

DEVICE DRIVING THE FLAPPING OF A CARRIER PLANE

The present invention relates to a device for driving a carrier plane, preferably a profile one, submerged in a fluid, for giving said plane a reciprocating flapping consisting of pitching tilt and transverse movement for either producing a movement or recovering energy from the fluid movement.

Such a profile carrier plane is for example the one known under the English term "foil" and consists of a profile wing that moves in the water and transmits a lift force to its support. The velocity of movement of the support of the wing indeed generates on this wing a hydrodynamic lift capable of lifting for example a boat hull, or a windsurf type board, partially or totally out of the water.

The present invention therefore provides for the use of such a wing, which may also be called a hydrofoil, skeg, scoop, paddle, wing or fin, depending on its size and function, by giving it an alternating flapping composed of a linear or arcuate movement and a tilt, to recover the kinetic energy of a fluid or to move a machine or a fluid, it being understood that the term "fluid" is used here to refer to a material which is perfectly deformable (for example, water, air, etc). All types of foils can be used, including those of relative flexibility or those with controlled deformation.

The invention relates to the development needs of three sectors in particular:
- propulsion devices for maritime or river machine, the context of which pushes the parties to make the systems less energy-consuming while possessing strong manoeuvring potentialities to guarantee their operational autonomy and their safety without losing reliability and in addition being more respectful of the environment: acoustic and visual discretion, more harmless for the fauna;
- the production of so-called renewable energy by exploiting the natural kinetics of the atmospheric, maritime or river environment (current, tide) with expectations concerning efficiency, robustness, advantages against biofouling, low impact on the natural environment and adaptation to numerous operating contexts: urban machines on buildings, river machines on the bottom, floating marine machines;
- the development of small or mini robotic underwater exploration vehicles, aerial or submerged drones in charge of photography, research, surveillance, sampling or delivery missions, for which biomimetic flapping foils would provide numerous advantages.

State of the Art

A system with one or more flapping foils is inherently better than those that rotate around a hub such as those of an ordinary propeller or those on a tubular hub with the blades often pointing inwards. There are mainly three reasons for this.

The first is hydrodynamic and related to the rotation of the blades which produces in particular: a wake which is basically helical and not orthogonal; a hydrodynamic pressure along the blade which is radially variable and not constant; does not allow the optimum incidence setting over the entire length of the blade; the number of blades multiplies the losses due to marginal vortices which are added to that of the hub cover or the tubular hub which holds them. Furthermore, the alternating tilt of the oscillating foil generates in itself a hydrodynamic unstationariness of the flows (release of vortices evenly) which basically increases its efficiency under certain conditions.

The second reason is related to the case of devices that have to respond to different conditions of advance without loss of efficiency (speed or fluid velocity); this is what variable pitch propellers try to respond to, but the variability of the three-dimensional geometry that this ideally requires (dynamic twisting of the blades, restricted hub) comes up against technological limits.

Finally, for moving machine, the third drawback of the propeller is related to the configuration for manoeuvring, that is: adding a rudder or mounting the propeller on a pivoting pod. The first solution is traditional but provides limited manoeuvrability; the second greatly improves this objective but at the cost of a complex kinematic and/or electrical chain whose accessibility is nil or restricted, so that its choice often raises questions. Moreover, in both cases the additional device adds drag, which reduces the performance of the whole.

Apart from the propeller blade arrangement, two generic configurations of foil operation are possible: rotor-mounted vanes (vanes substantially perpendicular to the rotor) and alternating flapping wings.

Thus, for rotor-mounted blades, a first series of systems is known consisting in positioning one or more foils, generally in this case called vanes, perpendicular to one or two planar rotors located in a plane tangent to the flow, such systems being known as cycloidal thrusters of the Lipp type described in WO-A-2002070890 or Voith-Schneider as well as changes of these systems such as those described in WO-A-2014006603, WO-A-2016067251 and WO-A-2017168359 or systems close to them such as for example those described in WO-A-1988010207.

In this type of device, the trajectory of a vane in the fluid is a cycloid, that is, a relatively vortex-like trajectory that is highly dependent on the ratio: rotor velocity of rotation $\omega$ to forward velocity u. Thus, setting the incidence $\alpha$ of a blade on the trajectory is not easy and in fact, a sometimes important part of the trajectory is not efficient or even counterproductive, thus limiting the performance of this type of system which, on the other hand, can offer a good manoeuvrability.

If turning now to the foil with an alternating flapping, many systems have been provided. However, due to the drawbacks of these systems, especially the fact that they have to operate at a limited translation velocity or because of the need for complex auxiliary or/and control members, devices including a hydraulic main actuator (cylinder) or systems with a non-rotating main motor or generator motion or requiring alternating rotations are excluded from prior art. Due to their reliability, mechanical systems resulting in continuous rotation are therefore preferred.

Thus, based on this technologically advantageous continuous rotation, many systems, such as FR-A-1330218, FR-A-2470875, U.S. Pat. No. 5,401,196, FR-A-2797428, WO-A-2003/062048, WO-A-2004/110859, WO-A-2009/074580, WO-2009/068762, US-A-2011/0255971, US-A-2014/0328682, use the crank or wheel-crankpin-connecting rod or wheel-crankpin-lever system to transform continuous rotation into linear or arcuate reciprocating motion to produce the motions of a foil. This technological solution, although simple and robust, has many disadvantages for the intended application: the axis or the bit of the foil is laterally offset from the wheel, making the devices not very compact and sometimes not symmetrical in relation to the axis of the vessel; the adjustment of the orientation of the pitching tilt oscillation is not possible except by interposing an additional actuator (jack) in permanent motion on the connecting rod or the lever, making its connection problematic; for the needs of hydrodynamic efficiency, the tilt oscillation cannot be independently parameterised. In addition, the connecting rod-crank system has a relatively asymmetrical heave kinematics in velocity and acceleration (as a function of the connecting rod-crank length ratio) whereas the pitch as produced has a symmetrical function, hence an asymmetrical hydrodynamic operation which will reduce efficiency.

Finally, only a few systems depart from this scheme to produce the oscillation of a foil, WO-A-2016/004800 especially with the use of a planetary gear train but in the latter only the roll translational motion is generated.

Moreover, in many systems, FR-A-1330218, FR-A-2470875, FR-A-2797428, WO-A-2004/110859, US-A-2011/0255971, supporting structures or structures guiding the wing in position degrade the hydrodynamics.

Finally, the sealing between the hydrodynamic and mechanical parts is very rarely discussed and does not seem easy to achieve in most systems.

All of the documents in the state of the art therefore generally set forth elements that disturb the hydrodynamic potential of the foil and an overall size of the mechanism that limits the possibilities of implementation. In addition, the pitch function is either not present in the current state or is only delegated to the flexibility of the profile, or is not adjustable in amplitude in a simple manner without an additional on-board actuator on a moving, or even sometimes rotating part of the mechanism. Similarly, the pitch function is not adaptable, as it is basically only sinusoidal; however, as will be explained, different functions are of great interest. In addition, the devices described providing an effective sealing between the hydrodynamic and mechanical parts are rare, which leads to limitations in use or durability. The orientation function of the flapping foil when it is in a position to be able to act as a rudder (vertical position) is rarely present or limited and often cannot be achieved without disturbing the transverse movement function (non-decoupled functions), that is, the rotation of the engine or generator.

Thus, the present invention provides for the removal of some or all of the above-described barriers preventing common use, thereby opening up the possibilities of using the flapping of a foil for the mentioned applications.

DISCLOSURE OF THE INVENTION

For this purpose, the invention has as its main object a combined flapping drive device for a foil, preferably a profile foil, the combined flapping being at the minimum comprised of a movement (heave translation and/or roll or pitch swing) and a pivoting of the foil's drive axis (pitch swing), which axis is called a bit and which is connected to a device for laterally movably driving a primary shaft with positions parallel or not to its longitudinal axis and pivotably driving it about its longitudinal axis.

It is also an object of the present invention to provide a device for movably driving a primary shaft (translation and/or swing) and pivotably driving it about its longitudinal axis.

Thus, the invention relates to a device for movably and pivotably reciprocatingly driving a primary shaft about its longitudinal axis, characterised in that the device comprises a primary shaft and three systems operating in cooperation, the first system S1 comprising means for movably driving a control member along a trajectory $\lambda$ in the form of a closed curve, having at least a first axial component $\tau$ and a second axial component $\sigma$, the second system S2 comprising means for pivotably driving, of heel angle $\varphi$, said primary shaft about its longitudinal axis, configured to be actuated by the movement of said control member along at least one component, preferably the axial component r, of the trajectory defined by the system S1;

the third system S3 comprising means for movably driving the primary shaft, configured to be actuated by the movement of said control member along the other component, preferably the axial component $\sigma$, of the trajectory $\lambda$ defined by the system S1, said control member being configured to extend protrudingly from the plane ($\sigma$, $\tau$) of said axial components of its trajectory $\lambda$ or a projection thereof in that plane and to be in engagement with both the means for pivotably driving the primary shaft and the means for movably driving said primary shaft, the movement of the control member along the closed curve generating both a pivotal control $\varphi$ in one direction and then in the opposite direction of the primary shaft about its longitudinal axis and the movement of the primary shaft in one direction and in the opposite direction.

Thus advantageously, the cooperation of these three systems using only the control member, such as a crankpin, enables the generally planar movement of the control member to be transformed into two distinct and coordinated motions of the primary shaft.

Such a device for driving a primary shaft is particularly advantageous for implementing a combined flapping drive device for a foil such as a profile wing.

To this end, the invention also relates to a combined flapping drive device for a foil such as a wing, submerged in a fluid, provided with a drive shaft called a bit, characterised in that it comprises at least one device for movably driving a primary shaft and pivotably driving it about its longitudinal axis, comprising said primary shaft and three systems operating in cooperation, the first system S1 comprising means for movably driving a control member along a trajectory $\lambda$ in the form of a closed curve, having at least a first axial component r and a second axial component $\sigma$, the second system S2 comprising means for pivotably driving, of heel angle $\varphi$, said primary shaft about its longitudinal axis, configured to be actuated by the movement of said control member mainly along the axial component $\tau$ of the trajectory A defined by the system S1, according to a main function $\Phi(\tau)$ fixing $\varphi$;

the third system S3 comprising means for movably driving the primary shaft, configured to be actuated by the movement of said control member along mainly the second axial component $\sigma$ of the trajectory $\lambda$ defined by the system S1, said control member being configured to extend protrudingly from the plane ($\sigma$, $\tau$) of its trajectory or a projection thereof in that plane and to engage both the means for pivotably driving the primary shaft and the means for movably driving said primary shaft, the movement of the control member along the closed curve generating both a pivotal control $\varphi$ in one direction and then in the opposite direction of the primary shaft about its longitudinal axis and the movement of the primary shaft in one direction and in the opposite direction, the device further comprising a connection system S4 provided between said drive device of the primary shaft and the axis or bit of the foil for transmitting the combined movement and pivoting motions of the primary shaft to this bit.

Advantageously, this drive device produces the essential kinematic components or precursors of the fundamental combined flapping of the foil and is always formed by the cooperation of these three systems S1, S2 and S3, whatever the configuration.

Advantageously, these essential motions of the primary shaft are then directly or indirectly transmitted to the bit of the foil to form a minimal effective system via a fourth connecting system S4 which defines the configuration of the device.

The term configuration is used to refer to an embodiment of the invention which changes the type of positioning of the foil and sometimes the components of its motion in relation to the device generating the essential kinematics; a configuration may contain several foils with similar or dissimilar motion components. It is specified a same foil is involved, even if it is divided into two parts, insofar as the motions of the two parts are identical and integral with the same axis, called the bit, that is, they remain especially in the same plane.

A foil of a device according to the invention can be fitted in relation to the machine or the frame according to two so-called generic types of configurations. According to a first type of configuration, a profile foil such as a profile wing 1 connected directly or indirectly to the primary shaft may extend with its longitudinal axis substantially orthogonal to the wall of the machine or frame to which it is assembled, as visible in FIG. 1-A, the transverse motion of said foil being substantially tangential to this wall, bearing in mind that the wall is defined here as a part of the physical envelope of the machine or casing containing the drive device according to the invention. This type of generic configuration is called T-shaped with several possible cases, depending on the type of transverse motion and the presence or absence of an offset of the foil.

In the simplest case, the profile wing is attached directly to the primary shaft of the drive device of the primary shaft by the axis about which it can tilt, referred to as a bit fitted to the profile of the profile wing, and it undergoes a linear transverse movement. To this end, the bit passes through a slot provided in the wall of the casing containing the drive device which can be installed behind the wall of the machine.

In a second type of configuration, the foil has its plane substantially parallel to the wall and the transverse motion is then substantially normal to it, as in FIG. 1-B. This type of generic configuration is called H-shaped. In this case, the foil is attached to the drive device according to the invention by, on the one hand, its tilt axis, that is, the bit, and on the other hand, by at least one element preferably orthogonal to this axis and carrying the same without movement, called a rammer. The latter is then substantially normal to the wall of the machine and can pass through it, through an opening fitted with a bushing and joint bearing or equivalent, ensuring guidance and sealing between the mechanical parts of the drive device and the hydrodynamic parts of the foil.

Starting from these generic configurations (T and H), many other configurations are possible, by adapting the drive device to the position and motions of one or more foils, the core of the device called the fundamental device producing the essential kinematic components remaining the same.

The fundamental motions of the foil generated by a device according to the invention are therefore a pitching tilt $\phi$ and a transverse motion with respect to the velocity u of the fluid flow (relative to the velocity of the foil) upstream of the foil, this transverse motion can be comprised of a movement, denoted as $\Sigma$, in substantially the heave direction, or of a roll or pitch swing, denoted as $\Psi$, or of a composition of a movement $\Sigma$ and a swing $\Psi$, to which surge, sheer and yaw components may be added depending on the direction and curvature of the transverse motion.

As a reminder, FIGS. 2-A and 2-B represent the motions used in the navy or aviation applied here to a foil such as a profile wing and in which P corresponds to heave, C to surge, E to sheer, R to roll, L to yaw, T to pitch for a so-called T-shaped configuration of the profile wing (FIG. 1-A) and a so-called H-shaped configuration (FIG. 1-B). In these figures, the main orientation of the velocity u of the fluid flow and that of the reference frame R (o;x,y,z) related to the machine or frame are also represented. The directions of u and the pitch axis of the wing define all motions and directions. The pitch axis can be movably driven by rotatable drive resulting in a pitch tilt $\phi$ and by transverse movement which is either substantially linear $\Sigma$, or pivoting with an angle swing $\omega$ or even curvilinear in two or even three dimensions.

Each of the systems obtained according to the invention are simple, efficient and robust mechanical devices whose particular arrangement for distinct but cooperating functional tasks provides the drive device according to the invention.

The invention also relates to a machine comprising at least one combined flapping drive device for a foil as a means for moving or propelling said machine on the surface or submerged in a fluid.

The invention also relates to a device for producing energy from a fluid such as water or air, comprising at least one combined flapping drive device for a foil as a means for recovering energy from the fluid.

Definitions

Definitions are given hereafter relating to terms which are used in this description.

Thus, the term small planet gear is used to refer to a third wheel in a planetary gear train consisting of a sun gear and a planet gear, this small planet gear being located in an intermediate position with respect to the two preceding ones, and rotating around the sun gear at the same velocity as the planet gear. In the case of a planetary gear train, the small planet gear is geared to the sun gear and the planet gear, thus rotating the latter. In the case of a pulley or pinion train with a belt or chain between the sun gear and the planet gear, the equivalent of this small planet gear is in the position of a roller-tensioner and is called a roller.

The term epitrochoidal is an adjective relating to an epitrochoid which describes a planar curve drawn by a point (that is, the trajectory of this point) belonging to a disc or being attached to it via an extension, the disc rolling on the outer part of a fixed circle. The term antiepitrochoidal is used in the present invention to describe a similar planetary gear train producing a trajectory with a point belonging to a planet gear, or being integral with it via an extension, the proper rotation of the planet gear being in the opposite direction to the rotation about the sun gear, being proportional to the ratio of the radii of the sun gear to that of the planet gear. The planet gear therefore does not materially touch the sun gear and its proper rotation can take place via a small planet gear in the case of an ordinary gear train or via a belt or chain between the planet gear and the sun gear in the case of a pulley or pinion train.

Integral elements are elements fixed to each other without a degree of freedom such as a weld or allowing only small relative motions to absorb vibrations or equivalent, for example by means of an elastic element or elements.

Connected shafts or wheels are relating to two wheels or two shafts whose successive links ensure the transmission of rotation, whatever the respective position of these axes in space: parallel, orthogonal or any intermediate position. Similarly, connected wheels or shafts refer to the fact that these wheels or shafts are connected.

Abbreviations are used in the present description according to the following list:
- $\phi$: pitch angle of the axis of the foil (proper rotation of the axis and foil)
- $\beta$: additional angle for orientation adjustment of the hydrodynamic resultant
- $\Sigma$: linear transverse movement of the foil
- $\Psi$: transverse swing angle of the bit of the foil or of an element carrying the same, especially according to a roll or pitch angle respectively
- $\mu$: trajectory of the bit of the foil (of the tilt axis of the foil) in the fluid
- $\xi$: inclination of the transverse movement with respect to the direction $\gamma$ corresponding to the heave;
- $\varphi$: heel angle of the primary shaft (proper rotation of the shaft)
- $\gamma$: swing angle of the primary shaft
- $\lambda$: name given to the trajectory of the control member or crankpin
- $\sigma$: main transverse component of the trajectory $\lambda$ of the so-called crankpin
- $\tau$: secondary transverse component, generally perpendicular to $\sigma$, of the trajectory $\lambda$ of the crankpin
- $\Delta$: movement of the control element or of an element carrying the same for a speed adjustment
- $\chi$: phase shift angle of the moving wheel with respect to the driving wheel
- $\overline{\omega}$: velocity of a chain carrying a crankpin
- $\omega$: velocity of rotation of a drive wheel
- p: pitch of the helical path
- u: relative main velocity of the fluid flow with respect to the machine
- v: transverse movement velocity of the foil,
- $\alpha$: angle of incidence of the foil (angle between the actual relative velocity, that is, the resultant of u and v, and the chord of the foil profile)
- F: resultant hydrodynamic force on the foil composed of lift and drag
- $\theta$: in the plane of the trajectory $\rho$ local angle of the trajectory (with respect to the coordinate x)
- f: flapping frequency
- a: flapping amplitude
- St: Strouhal number (with St=a.f/u)
- R: orthonormal Cartesian reference system (o;x,y,z) of the frame or machine on which the device is installed
  - o: axis of rotation of the driving wheel, origin of the reference frame R
  - o': axis of rotation of the crankpin-carrying planet gear
  - o": axis of rotation of a small planet gear or a roller
  - i: attachment (fitting) point of the bit in the profile of the foil
- $\Xi$: kinematic transformation function related to a configuration
- $\Phi$: definition function of the helical path.

The Fundamental Systems

According to a first embodiment, the device for laterally movably driving a primary shaft and pivotably driving it about its longitudinal axis comprises a first system S1 comprising means for movably driving a control member along a trajectory in the form of a closed curve $\lambda$, having at least a first axial component $\tau$ and a second axial component $\sigma$, said control member extending protrudingly from said plane ($\sigma$, $\tau$) preferably substantially perpendicular to the plane, that is, with an angle of 90°+/−ε°, ε being small in front of 90°, for better adjustments with the controlled parts;
  the second system S2 comprising means, of heel angle $\varphi$, for pivotably driving said primary shaft about its longitudinal axis, mounted to a rotation axis coaxial with the longitudinal axis of the shaft; and comprising guide means configured to cooperate with the control member along a helical movement trajectory of said control member about the longitudinal axis of the primary shaft;
The third system S3 comprising means for laterally movably driving the primary shaft, comprising a support to which the primary shaft is freely rotatably mounted about its longitudinal axis, the support comprising guide means configured to cooperate with the control member and allow the latter a free movement along a trajectory, preferably linear and parallel to the longitudinal axis of the primary shaft and driving the same along a trajectory substantially orthogonal to the longitudinal axis of the primary shaft, as well as a guide means such as an elongated element along which the support is movably, slidably or rollably mounted, said guide means extending substantially orthogonally to the longitudinal axis of the primary shaft or by means of an equivalent device in this function such as the systems with hinged bars or plates developing a rectilinear or quasi-rectilinear trajectory such as the Watt, Chebyshev, Peaucellier-Lipkin, Sarrus mechanisms;
  the control member being configured to extend protrudingly from the first system, in engagement with the guide means of the system S2 and the guide means of the system S3, such that, during its movement along the trajectory $\lambda$ defined by the system S1, said control member is free to move in the guide means of S3 only along the component of the trajectory parallel to the longitudinal axis of the primary shaft, the other component of the trajectory generating the movable drive of said support along the elongated element of the system S3 or of the equivalent device, while the control member is movably drivable, simultaneously, along the guide trajectory defined by the system S2, by rotatably driving the means for pivotably driving the primary shaft, and thus said primary shaft, mounted freely rotatable to the support.

System S1

The functional system S1, which comprises means for movably driving a control member along a trajectory, or the projection thereof in a plane, in a continuous planar loop, allows both the transverse movable drive of the wing, $\Sigma$ and/or $\Psi$, as well as the movement serving as a basis for its tilt $\phi$ by cooperation with the two systems S2 and S3.

It is thus comprised of means allowing the transformation of a continuous rotation of velocity $\omega$, coming from a motor for example, into a planar trajectory or a closed $\lambda$ planar component of a point element, the control member most simply consisting of a cylindrical axis end, normal to this plane, and named crankpin. The trajectory of said crankpin produced by the system S1 is a closed curve, preferably having at least one axial symmetry, and more preferably a continuous symmetrical closed curve of centre o, thus preferably having a major axis and a minor axis intersecting at right angles in the centre o. Then, this trajectory, named λ, can be broken down along these axes into two combined, preferably linear, movement motions, named σ and τ. These motions are by nature periodic, alternating if o is internal to λ and phase-shifted by a quarter turn if σ and τ are perpendicular. The main movement σ produces the transverse motion of the foil Σ and/or Ψ via the system S3. By its function, it is oriented transversely to the relative velocity u of the fluid. The movement r, on the other hand, produces the pitch tilt φ of the foil via the system S2.

In examples of the system S1 according to the invention, the driving means of the system S1 are configured to define the trajectory λ in the form of a closed planar curve which has a major axis defining the component σ and a minor axis defining the component r, this trajectory being in particular a circle, an ellipse or an oblong curve.

The drive means of the first system S1, denoted as S1c, may consist of a flexible transmission member such as a strip, a belt, a chain, movably driven in a plane by at least two drive members such as pulleys, pinions, the transmission member carrying the crankpin as a control member protruding above the plane of the trajectory, this crankpin being movably driven and describing a trajectory in a parallel plane. Consequently, the path λ is planar and the curve preferably oblong.

Alternatively, the drive means of the system S1 may consist of a planetary gear train, preferably located in a plane generally parallel to the plane of the trajectory λ of the control member, such as a crankpin, located on the flank of a planet gear or of an extension integral therewith, the axis of rotation o' of which is positioned on the flank of a so-called driving wheel or crank of the planetary gear train, and of the hypocycloidal or hypotrochoidal type (planet gear inside a ring gear), denoted as S1hypo, or of the epicyclic, epitrochoidal or antiepitrochoidal type, denoted as S1épi, according to the definition given above. The trajectory is then planar and the curve preferably elliptical.

Advantageously, these drive means have good or even very good transmission efficiencies and, in addition, are robust and economical.

For an elliptical and circular trajectory, the two components σ and τ are sinusoidal in nature; these components being symmetrical saw-toothed with rounded ends for the substantially symmetrical oblong shape. It goes without saying, however, that the person skilled in the art can choose another trajectory of the crankpin with these same means or other drive means without departing from the spirit and scope of the invention.

In the case of a substantially oblong shaped planar trajectory λ, the crankpin can be mounted integral with a link of a roller transmission chain or equivalent, tensioned between two pinions or two groups of coplanar pinions which ensure that it is held in place and at least one of the pinions of which is connected to a rotatable drive means such as a motor, generator, pump . . . . This embodiment of the system S1 is denoted as S1c.

In the case of a circular planar trajectory λ, the drive means of the system S1 are a wheel or a crank, or a series of parallel wheels and cranks, rotating at a substantially constant velocity ω about their central pivot and to which a control member such as a crankpin is fitted. Thus, the control member or crankpin is integral with the so-called driving wheel or crank, rotating about the centre o, and whose continuous rotation is related to a motor, a generator or a pump. This type of system S1 is denoted as S1m.

In the case of an elliptical planar trajectory, the trajectory λ can be generated by a planetary gear train of the hypotrochoidal type whose ratio of the radius of the sun gear, of centre o, to the radius of the planet gear, of centre o', is equal to 2. As a reminder, a hypotrochoidal gear train is materialised by a sun gear such as a ring gear which is fixed in position and rotation and a planet gear rolling inside the ring gear which carries the crankpin on one of its flanks or on an extension. In this system, the planet gear's proper rotation around its centre is due to the ring gear-planet gear, the planet gear's proper rotation therefore being in the opposite direction to that of its centre around the centre of the sun gear. When the elliptical trajectory becomes a segment (τ=0), this leads to the geometric solution known as the Hire line characterised by a crankpin on the periphery of the planet gear, that is, for toothed wheels, on the so-called primitive radius. This embodiment of the system S1 is denoted as S1hypo.

Another type of planetary gear train is possible in order to produce an ellipse; this is the so-called antiepitrochoidal embodiment as defined above and denoted as S1epi-c for the chain or belt version and S1epi-e for the gear version. In these embodiments of the system S1, the ratio of the radii of the sun gear to that of the planet gear is equal to 2; the central sun gear of centre o is fixed in position and normally in rotation; the planet gear of centre o' and the small planet gear(s) or the tension roller(s) of centre o'' rotate around o, via a wheel, driving their axis; and the crankpin is preferably positioned on an extension integral with the flank of the planet gear so as to produce an ellipse with a certain elongation, that is, a ratio σ/τ preferably greater than 2. As with the hypotrochoidal system, the Hire solution is possible when the distance from the crankpin to the centre of the planet gear is equal to the distance separating the axes o and o' of the sun gear and the planet gear.

Whatever the type of trochoidal planetary gear train just mentioned—hypotrochoidal or antiepitrochoidal—the planet gear is rotated about the axis o common to that of the fixed sun gear, preferably by means of a wheel, also known as a driving wheel, to which the pivot of the planet gear and, if applicable, the small planet gear or roller, are attached. This wheel is therefore in a plane parallel to the planetary gear train and opposite to the plane of the trajectory λ of the crankpin. The rotation of said driving wheel by the driving or operating member such as a motor, generator, pump, etc., or an intermediate system such as a reduction gear, can then especially be achieved by a gear or by a flexible belt or chain type transmission.

The above-described embodiments of the system S1 are minimum sets of elements to ensure the function of the system S1. The addition of complementary elements is obviously possible to balance the system or to reinforce it, in particular: 1) the addition of a balancing mass opposite to the planet gear on the wheel or on the driving crank; 2) the addition of support wheels, with free proper rotation around said driving wheel to cancel the bending of its pivot; 3) the addition of a second small planet gear or a second tensioning roller on the driving wheel; 4) a planet gear and a sun gear, especially with double teeth, in parallel planes integral with the ends of the same pivot axis, with an arrangement of the teeth on either side of the driving wheel; and finally 5) with the system S1, without or with one or more of these complements, doubled in a mirror image with a common crankpin, or separate crankpins facing each other, in the centre.

System S2

The second system S2 directly or indirectly controls the pitch tilt $\phi$ of the foil from the secondary motion component $\tau$ generated by the system S1. It is unique in principle but infinitely adaptable in design. The system S2 comprises means allowing the transformation of the secondary component $\tau$ of the motion of the crankpin along the trajectory $\lambda$ into an alternating tilt motion, of angle denoted as $\varphi$, in a plane substantially orthogonal to the trajectory $\lambda$. To this end, the second system S2 comprises means for pivotably driving the primary shaft about its longitudinal axis, mounted to an axis of rotation coaxial with the longitudinal axis of the primary shaft and provided with guide means configured to cooperate with the control member along a helical movement path about the longitudinal axis of the primary shaft, such as a cylinder provided with a groove forming the cam path of the control member, such as a crankpin, the function $\Phi(\tau)$ giving $\varphi$, being linear or not Thus, the control member or crankpin cooperates with these guide means defining a guide path of a helical nature, that is, a preferably cylindrical spiral, carried by an axis or median axis if the same swings, substantially parallel to $\tau$ and connected to the primary shaft.

Thus, the component $\tau$ of the trajectory imparts a heel tilt of angle $\varphi$ to the guide means including the helical movement path forming a cam path and to the primary shaft connected thereto. This primary shaft in turn directly or indirectly transmits, via a transmission system S4, the heel tilt $\varphi$ to the bit of the foil then producing its pitch $\phi$, knowing that $\varphi$ and $\phi$ are generally equal or substantially equal depending on the elements introduced into the system S4 for the operating needs of the configuration.

For embodiments corresponding to circular or elliptical trajectories $\lambda$ of the crankpin, the wave of heel $\varphi$ produced is of the sinusoidal type if a linear function $\Phi$ is given at design to the cam path ($\Phi(\tau)$: $\varphi = \varphi_0 + 2\pi \cdot \tau / p$ where p corresponds to the pitch and $\varphi_0$ to a constant phase shift). Non-linear transformations can nevertheless be materialised. Thus, the sinusoidal signal of $\tau$ may be transformed for example into a relatively squarer function $\varphi$ corresponding to a bulge in the sinusoid (for example $\Phi(\tau)$: $\varphi = \varphi_0 + 2\pi \cdot |\tau/p|^n \cdot \text{sign}(\tau)$ with $0 < n < 1$) or into a non-symmetric signal if it is interesting.

Moreover, depending on whether the drive device for the foil is dedicated to propulsion or to energy production, the pitching is configured differently corresponding in one case, to an opposite tilt of the foil with respect to the trajectory of its bit. Indeed, in the case of a device dedicated to energy production, the pitch rotation has to be greater than in the case of a propulsion device. It should be noted that both cases are ultimately defined by the orientation of the projection of the hydrodynamic lift of the foil on the axis x: in the productive case, the projection of the lift and the relative velocity u of the fluid are in the same direction with energy capture; they are in the opposite direction in the propulsive case with the need for an energy input. The increase in the amplitude of the heel angle $\varphi$ that this entails in the productive case can be obtained materially by a helical path with a shorter pitch, or with a same pitch, by increasing the width of the movement range $\tau$ of the crankpin.

On the other hand, if the cancellation of the pitch tilt during the flapping is desired, for example for stopping a productive machine, the system S2 will allow it if, on the one hand, the function $\Phi$ of the helical cam path does not include a constant term ($\varphi_0 = 0$), and on the other hand, if the system S1 in one of its alternatives admits that $\tau$ is zero whatever $\sigma$, that is to say, for trochoidal systems, the Hire solution.

For the materialisation of the helical cam path characterising the system S2, the pivotal drive means consist of a cylinder provided with a groove or a protruding rail forming the cam path, mounted coaxially with the primary shaft. Thus, the simplest embodiment is a grooved cam in which a groove, possibly through-going, forming the cam path, is provided on the cylinder. This cylinder is mounted coaxially with the primary shaft, either on an axis end from the primary shaft or on a hollow cylinder engaged on the primary shaft.

Alternative systems are possible to limit the forces and wear on the crankpin and the cam path, for example with a system of mating cams and/or cam rollers.

System S3

The system S3 enables the structural guidance of the components provided by the systems S1 and S2, thus the fundamental motions of the flapping, namely the transverse movement motion along the component $\sigma$ and the motion of heel tilt $\varphi$, are exploitable.

The third system S3 comprises means for laterally movably driving the primary shaft, in parallel or not to its longitudinal axis, configured to be actuated by the movement of said control member along the trajectory defined by the system S1.

According to one embodiment, these drive means comprise a support to which the primary shaft is freely rotatably mounted about its longitudinal axis, the support comprising guide means configured to cooperate with the control member and to allow it free movement along a substantially linear trajectory of the control member, parallel to the longitudinal axis of the primary shaft. This generally linear trajectory of the control member drives the primary shaft along a trajectory substantially orthogonal to the longitudinal axis of the primary shaft due to a substantially linear guide means, guiding it in this orthogonal trajectory such as an elongated element along which the support is movably, slidably or rollably mounted, in order to follow its guidance, said guide means such as a slide for example extending substantially orthogonally to the longitudinal axis of the primary shaft.

The support consists of normally planar faces orthogonal to each other and integral with each other, having at least one base and two opposite sides around the ends thereof. Furthermore, in addition to the base and the two sides, the support may have a face opposite to the base, called the bottom face, and a third side for the installation of elements. The base and the bottom face are substantially parallel to the plane of the trajectory $\lambda$ of the crankpin and one or the other or both are connected to at least one slide ram, either by being integral with it, or by an axis pivot with, if necessary, a small amount of deflection possible or equivalent.

This support carries at least the primary shaft via bearings or equivalent mounted to its opposite sides. The base of said support is positioned between the drive means of the crankpin in the system S1 (link, wheel, extension) and the pivotal drive means of the primary shaft in the system S2. This base is provided with guide means such as an oblong opening called a slot, or equivalent, allowing both the meshed engagement of the control member and its clearance along the slot along the component $\tau$ of the trajectory $\lambda$, the head of the control member passing through said slot to engage on the guide means of S2, while the part of the control member in the slot of the support drives the support, along the component $\sigma$ perpendicular to the slot by abutment on its edges, generating the movement of the primary shaft along this component σ along the elongated element of S3.

In order to avoid wear of the crankpin on the edges of the slot, a bearing or any other device of equivalent utility device may be added, the crankpin may also be replaced by an assembly of elements in this function.

The elongated element as a guide means of the system S3 is preferably a preferably linear slide and extends substantially orthogonally to the primary shaft, that is, in parallel to the component σ of the crankpin movement and orthogonally to its component τ. The support is slidably or rollably mounted to this slide by means of a ram to which the support is mounted either fixed or pivoting and capable of swinging through an angle γ. In addition, so as to guide the primary shaft in a plane substantially parallel to the trajectory λ of the crankpin, this slide prohibits rotation along the guide axis of the ram on the slide, with the use of a non-cylindrical or splined slide-ram pair, unless, in the system S4, a second slide or a complementary pivot is present to guide the same primary shaft in order to guarantee this condition.

Alternatively, solely hinged devices may be contemplated, without slides or rails to achieve this transverse guidance, such as the planar mechanism known as the Chebyshev horse or the three-dimensional Sarrus mechanism.

For the purposes of the configuration defined by S4, in the case where the longitudinal axes of the primary shaft and the slide of S3 have to be not always strictly orthogonal and allow an angle γ, the support has to be pivotably mounted to the ram. The support can thus pivot through an angle γ on the ram to follow the swing Ψ of the bit or a member carrying the same, this pivot being preferably mounted orthogonally to the bottom face of the support and the point of its projection in the plane of λ substantially at σ through the axis of the helical path.

This system S3 also serves as a transmission base for the system S4 which transmits the motions to the foil without or substantially without modification, the motion parameters of the foil being in fine Σ or/and Ψ and φ as defined. Moreover, the system S3 has to take up the part of the hydrodynamic force F not taken up by the systems S1 and S2, namely essentially the surge component of this force (Fc), and the roll, yaw and pitch moments M at o (Mr/o, Ml/o and Mt/o) related to the offset of F with respect to the drive device; it must also take up the sheer component (Fe) if necessary. Indeed, the systems S1 and S2 only take up the transverse component of F, that is, only the heave force (Fp) and the pitching moment at i (Mt/i). The forces related to the friction of the moving parts in the device are then added, as in any mechanical system.

Configurational System S4

The system S4 consists of simple mechanical connecting elements enabling the fundamental components of flapping (σ, φ) produced by the cooperation of the systems S1, S2 and S3 to be transmitted to the bit of the foil in the position corresponding to a chosen configuration, moreover, design alternatives may exist for the same configuration.

The system S4 can be of a very simple composition by simply securing elements of the same type, as in the basic configuration which will be described hereafter, but it can also be comprised of common means enabling the transmission of the movements of a shaft with here for the primary shaft, a change of direction of φ, an offset of φ and an additional tilt γ or substituting for the transverse movement σ. In a number of cases, the connecting means of S4 are configured to achieve transmission to the axis of the foil without modification of the fundamental motions (φ=φ, σ=Σ and γ=Ψ=0), but in the general case there is a modification of motions such that: $(\Sigma, \Psi, \phi) = \Xi(\sigma, \varphi)$ where $\Xi$ is the kinematic modification function dependent on the composition and architecture of the system S4.

The system S4 may thus comprise at least one slide with a dedicated ram, to which the support or a complementary support is mounted.

For the transmission of the heel tilt angle φ, S4 may especially include: securing two substantially aligned shafts, with or without flexible coupling means; the shaft offset remaining parallel via spur wheels (gear, pulleys-belt, pinions-chain); the bell crank of shafts in a fixed position relative to each other, by means of bevel toothed gears; and swinging of one shaft relative to another, by means of Cardan type shaft transmission joint or its homokinetic equivalents.

For the offset of the bit of the foil, which amounts to the offset of the foil itself, the system S4 can especially include a means such as a rammer, characterised by a back-and-forth motion on its main axis; or an arm, characterised by a transverse movement or tilt motion of this same main axis. In both cases, the bit of the foil is carried without movement by said rammer or said arm, these elements being generally orthogonal to each other. Alternatives with especially two rammers or two arms on either side of a same foil, rather than a single one centrally positioned one, are of course possible without departing from the spirit and scope of the invention.

With regard to the transmission of the lateral movement characterised by the component σ of the crankpin movement, S4 can especially configure a transverse motion of the foil consisting of: a linear movement exclusively, preferably with the installation of a second slide to complement that of the system S3; a tilt exclusively, with the placement of an axis pivot and a radial shaft slide to follow the linear trajectory σ of the crankpin; a tilt and a radial movement, with the installation of a pivot-slide or pivot-on-slide for the same purpose; a tilt and a transverse movement, with the use of one or two complementary linear slides and an asynchronous ram coordination system as characterised in the guidance assist system set forth hereinafter.

Assist Systems

As explained, the systems S1 to S4 ensure the kinematics necessary for the perfect operation of the foil according to the configurations provided. Nevertheless, in the case of the presence of at least two guide slides according to a (in S3 and S4), a drive aimed especially at limiting the wear of the rams of the slides guiding the transverse motion can be added at a lower cost. Such a system, denoted as S5, is an additional assist system for slides. Indeed, the rams, if they are free to move on each slide, will have to take up alone the transverse moment (Mr/o) that the bit or its support (rammer, arm) undergoes under the hydrodynamic pressures of the foil, which results in a torque at each ram, causing strong localised pressures on the sliding members, whatever they may be (bearings, shoes, balls or rollers), which affects their life span. However, cancelling this torque consists in creating, in the case of a pair of slides, a pair of forces colinear to the slides, via a system of synchronous guidance of the movement of the ram of each slide, the assembly remaining free to move according to the position σ of the crankpin.

A simple and robust embodiment of this system consists in positioning a pinion on either side of each slide, connected by a flexible transmission element of the chain or toothed belt type, which carries the ram of the slide by at least one attachment point, such as a conveyance system. The pinions are then connected between the slides, at least on one side, by a shaft, called a connecting shaft, integral with each pinion, such that the movement of a ram on one slide leads via this system to a movement on the ram of the other slide. Two possibilities are then contemplatable: in the case where the connecting shaft connects pinions of the same diameter, the movement at each slide is synchronous and the element carried by a ram on each slide is, whatever the movement, orthogonal to the slides, if it was at the beginning (version denoted as S5syn); in the opposite case the movement of the rams is asynchronous, which produces a swing of the carried element, this one having then to be necessarily hinged on each ram (version denoted as S5asyn) In the latter case, the angle of swing is determined by the ratio of the diameters of the pinion connected to said connecting shaft and by the amplitude of movement of one of the two rams or an intermediate element.

Adjustment Systems

To the systems S1 to S3 associated with S4 making up the flapping mechanism, may be added a speed adjustment system S6 comprising means for controlling the range of heel angle $\varphi$ transmitted via the system S4 to the range of incidence $\alpha$ of work of the foil on its trajectory $\mu$ by acting in particular on its pitch tilt $\phi$. To this end, the speed adjustment system S6 comprises means for controlling the angle range $\phi$ of the foil during its movement $\Sigma$ and/or $\Psi$, consisting of means for parametrically modifying S1 to modify the component $\tau$ of the trajectory $\lambda$ of the control member acting mainly on S2, that is, the component T. The modification introduced thus consists in modifying the range of advance $\tau$ of the crankpin, produced by the system S1.

In the case of the embodiment of the system S1c generating a substantially oblong trajectory $\lambda$ with a chain driven by four or six pinions, the modification consists in varying in a coordinated manner the position of at least four of the pinions and preferably of the six, so as to widen or narrow, symmetrically with respect to the centre o, the width component $\tau$ of the trajectory $\lambda$ of the chain links. This can especially be achieved by:
 a structural system with hinged bars of the pantographic type with a row of lozenges in which the six pinions occupy the terminal positions of the end lozenge hinges;
 a control device for the relative position of the pinions, and therefore for the width of the trajectory of the chain links, of the jack type with a threaded rod linked to two opposite hinges of one of the pantograph lozenges in order to move them away from or towards each other;
 finally, as the pantograph is not modified at a constant circumscribed circumference length, a third tensioning device where preferably two end bars of the two end lozenges are fitted with an automatic spring-type jack to both ensure the tensioning of the chain and automatically modify the length of the bars. Moreover, for its stability, this pantographic system is mounted to a partition integral with the frame or the machine, one of whose pivots, preferably the central one, is fixed to the partition, while the axial pivots on either side of it, and at least one of them, slide on openings allowing transverse clearance or equivalent, with slides.

In the case of systems with a crankpin on a wheel or on an extension integral with a wheel, the speed control system includes two or three mechanisms. The first is related to the elements allowing the movement of the crankpin, the second is related to the elements allowing the adjustment of its position and the third is specific to the anti-epitrochoidal gear system to correct an unwanted rotation.

In the case of the embodiment of the system S1m generating a circular trajectory $\lambda$, version denoted as S6/S1m, the modification consists in varying, by an adjustable value $\Delta$, the radial position of the crankpin on said driving wheel carrying the same during the rotation thereof. If the use of an actuator (jack) with rotating connections is excluded, this is achieved by three sub-assemblies of complementary elements. The first sub-assembly is comprised of, especially, the driving wheel modified such that the crankpin or a ram carrying the same can move in the plane of the wheel substantially radially and freely, in a range of positions corresponding to the adjustment of $\tau$ accepted by the S2 system. The second sub-assembly comprises the crankpin and a counter-crankpin, preferably opposite each other sharing the same axis or on parallel axes, integrally connected together directly or through the radial positioning ram referred to in the first sub-assembly. The third sub-assembly comprises a counter-wheel, which will be referred to as a moving wheel, juxtaposed to the crankpin-carrying driving wheel as modified above, normally of the same diameter as the latter and sharing the same axis o, in which a spiral cam path or equivalent, which is referred to as a spiral path, is provided on its flank, opposite the possible positions of the counter-crankpin for the purpose of leading the latter in a part of this spiral path.

The whole of these three sub-assemblies is therefore functional in the following way: if a differential rotation called $\chi$ occurs between the driving wheel and the moving wheel, the counter-crankpin guided jointly by the radial path of the driving wheel and the so-called spiral path of the moving wheel, moves radially on the driving wheel carrying the same, which also moves the crankpin, the whole being done so that the crankpin and the counter-crankpin remain on a normal to the wheels by means adequate for this function.

In the above description, it goes without saying that the crankpin and counter-crankpin assembly can be physically held by one or the other wheel, or even by both on respective rams, or even by neither unilaterally insofar as the adjustment of the two paths in parallel but intersecting planes (the radial path and the spiral path) contribute sufficiently to holding the crankpin perpendicularly to the wheels, in its trajectory and for its function.

In the case of the embodiment of the system S1epi, which generates an elliptical trajectory $\lambda$, the hypotrochoidal version does not allow the adjustment in question with rigid gear wheels, unlike the antiepitrochoidal version where two possible sub-versions are possible: the chain or toothed belt version, denoted as S6/S1epi-c, and the gear version, denoted as S6/S1epi-e.

In both cases, the modification consists in varying the radial position of the axis of the crankpin carrying planet gear on said driving wheel to which said axis is fitted, during the rotation of the latter, which is obtained in the same way as for the movement of the crankpin for the embodiment with the circular trajectory of the previous paragraph. Therefore, the crankpin and the counter-crankpin are replaced in the preceding descriptions by the pivot of the planet gear and a counter-pivot, the latter having the same function and shape as the counter-crankpin. Therefore, since in the anti-epitrochoidal system the pivot of the planet gear and the crankpin are integral with the same element, the movement $\Delta$ of the pivot causes the movement of the crankpin.

However, the desired movement $\Delta$ requires adjustments to be made to the intermediate transmission elements (roller or small planet gear) to ensure kinematic continuity (chain tension or good gearing between each wheel) and to cancel or correct any unwanted rotation of the planet gear, related to its movement, which would result in the trajectory λ of the ellipse being rotated by distorting the pitching setting of the foil. To this end, in the case of the chain version (S6/S1epi-c), it is compulsory to introduce at least one tensioning roller and, in order to cancel the unwanted rotation, this roller or these rollers, regardless of their positioning, always have to be in a symmetrical position with respect to the straight line joining the axes o of the sun gear and o' of the planet gear. With regard to the positioning of the roller(s), the method is similar to that of the planet gear, that is, the crossing of paths on the driving and moving wheels respectively to guide their pivot and counter-pivot. Finally, for marginal movement, free clearance of the pivot of the roller(s) can be added with the thrust of a spring, and fixed position return rollers can also complete the device.

In the case of the geared version with a small planet gear (S6/S1epi-e), it is essential to have:
- only one small planet gear, otherwise the gears will jam during the movement Δ;
- the path of the small planet gear pivot on the driving wheel has to be an arc segment centred on o for the planet gear-small planet gear;
- that the axes of the planet gear and the small planet gear are connected by at least one connecting rod or equivalent to ensure the planet gear-small planet gear gearing regardless of their respective movements; and
- a third device, described below, is installed to correct the unwanted rotation of the planet gear.

In order to enable the adjustment of the speed adjustment system S6, a device is required to fix the differential rotation χ of said driving wheel and said moving wheel, but as they rotate at the same frequency to produce the expected flapping, it is more accurately a question of fixing their phase shift.

The device which allows this operation can advantageously include the system known as a differential, that is, a non-planar epicyclic planetary gear train, the sun gears being in distinct parallel planes and the planet gears orthogonal to these planes on a planet carrier. One of the embodiments here adapted therefrom is especially as follows: one of the sun gears, called the primary sun gear, is integral via a hollow shaft with a wheel, called the primary follower wheel, which is geared to one of the two driving or moving wheels; the second sun gear, whose axis of rotation passes through the hollow shaft of said primary sun gear, is integral via this shaft with a second follower wheel which is geared to a wheel called the inverter wheel, which is itself geared to the other wheel to be phase-shifted; the rotation of the planet carrier is directly related to a control lever which can be manual; the two follower wheels and the inverter wheel are of the same diameter; the two sun gears are also of the same diameter; and the inverter wheel has double teeth or a double width of teeth so that one half is geared to the follower wheel and the other half is geared to the driving or movement wheel; the diameter of the planet gear is unimportant.

The operation is as follows: the driving wheel rotates the primary follower wheel; which drives the primary sun gear, which causes the planet gears to rotate in the opposite direction, which in turn rotatably drive the secondary sun gear but in the opposite direction to the primary sun gear, which rotation is then transmitted to the secondary follower wheel, which in turn transmits it to the inverter wheel, which transmits it to the moving wheel, which has a rotation then equal to that of the driving wheel, except for an interval of time when the planet carrier undergoes a positive or negative control rotation, accelerating or decelerating the secondary sun gear, creating a constant phase shift χ between the driving wheel and the moving wheel after the moment when the control was exerted.

In the case of a version S6/S1epi-e, a corrective rotation equal and inverse to the sudden unwanted rotation has to be produced on the planet gear, which is achieved by producing a rotation of the sun gear of the same value and direction as the angular movement of the small planet gear axis, that is, in this case equal to the phase shift χ. Materially, a simple solution for this device consists in securing to the shaft of the control lever a wheel, called a control wheel, actuating a reduction gear acting on the shaft integrally connected to the sun gear of the anti-epitrochoidal train. In this device, according to the preferred description described, the reduction ratio of the rotations of the control shaft to that of the planetary shaft is equal to 2 times the ratio of the radii of the follower wheel to the moving wheel.

For the embodiments provided above, the system S6 does not exclusively modify the pitch tilt but also modifies the range of advance of the transverse motion σ, which, at constant velocity of rotation ω of the pinion or of said driving wheel, leads to a change in the trajectory μ of the bit of the foil. These two effects can be combined, partly neutralising each other, if the modifications in the trajectory λ are concentric. Thus, for a controlled pitch decrease φ aiming at increasing the incidence α, the angle θ of the trajectory will decrease, decreasing the incidence that would have been acquired with the pitch decrease alone and conversely for a controlled pitch increase.

A system parameterisation is then chosen, where this neutralisation effect is non-existent or not too pronounced to make the incidence adjustment sufficiently effective. It should nevertheless be emphasised that the embodiment of the fundamental system creating an oblong shape or an ellipse with a longer axis elongation along σ will be much less sensitive to this phenomenon, a controlled movement λ of the crankpin being proportionally smaller along σ than that along τ, indeed: $\Delta/\max(|\sigma|) < \Delta/\max(|\tau|)$ Orienter Systems To these systems composing the flapping device according to one or other of the generic configurations, an orienter system S7 can be added, aiming at directing the direction of the overall lift produced by the foil(s). The system thus aims at orientating, in a plane (x,y), the overall hydrodynamic resultant of the forces over a flapping cycle.

The orienter system S7 is applicable to all configurations. It introduces an additional angle that can be parameterised during operation, denoted as β, on the function Φ of the heel tilt φ of the primary shaft. This is then transferred via the transmission system S4, to the pitch tilt φ of the foil, with a choice of β possible over 360°. It therefore orientates the lift in a plane (x,y). Consequently, for T-type configurations, the device is equivalent to the action of a rudder on helm angle control. For the H-type configuration with a substantially horizontal foil, the device is equivalent to the action of an elevator controlled by a stick.

The S7 type orienter system comprises a hollow cylindrical shaft carried without movement on the support, via the bearings thereof, called a steering shaft. Said steering shaft is integral with the helical movement path and has an internal diameter allowing the passage of said primary shaft and, where applicable, intermediate bushings or annular bearings minimising friction and prohibiting relative movement of the shafts. This version also contains an epicyclic gear train of a preferably differential type, that is, having planet gears orthogonal to the two parallel sun gears: the first shaft, that is, the primary shaft, being integral with one of the two sun gears, the second, that is, said steering shaft, being integral with the other sun gear, and the planet carrier being assigned to the third shaft, called the orienter shaft, connected to a wheel, called the orienter wheel, which will control its rotation. These elements then cooperate in the following way: in the absence of control rotation motion on the orienter shaft, the primary shaft and the steering shaft are synchronous but inverted in their heel tilt (opposite direction, same velocity) imparted by the reciprocating motion $\tau$ of the crankpin, via the helical path on the steering shaft; on the contrary, in the presence of a rotation on the orienter shaft, depending on the direction of the control rotation, there is an acceleration or deceleration of the primary shaft leading to a persistent phase shift when the control rotation is stopped. According to the preferred embodiment described, the control rotation and the phase shift $\beta z$ are in a ratio of 1/2.

However, the orientation function is at this stage not actually possible. Indeed, regardless of the configuration, the orienter wheel undergoes the transverse movement $\sigma$. In order to connect this to a fixed axis in the reference system R (o;x,y,z), a second device is necessary.

A simple and reliable solution to the function of this device consists in:
- on the one hand, creating a splined shaft fixed in position, called the control shaft because it will be the control member, positioned in parallel to the movement $\sigma$ and therefore to the slide system of the system S3 or S4; and
- on the other hand, providing a endless screw and its complementary wheel, the endless screw sliding along its axis on the splined control shaft and the complementary wheel being the orienter wheel.

In order to ensure the movement $\sigma$ of the endless screw, a staple is added to the orienter shaft, related to the movement of the support or the shafts carried by the latter, whose wings pass on either side of the endless screw so as to drive it in one direction or the other. In order to define the connection between the orienter wheel and the orienter shaft according to the chosen configuration, either the connection between the support and the ram does not allow the swing and orthogonality between the slide and the primary shaft exists at all times, in which case the orienter wheel can simply be integral with the orienter shaft due to the fact that the endless and orienter wheel assembly also have orthogonal axes, or the swing is possible via a pivot and it is necessary to provide a guide for the orienter wheel on the splined control shaft so as to maintain the orthogonality of the axes of the geared wheels and the position of the orienter wheel in plane, the staple sliding on the splined shaft being able to participate in this system and, on the other hand, to provide a connection between the orienter wheel and the orienter shaft with a transmission joint of the Cardan type or equivalent and a shaft slide to compensate for the length of the orienter shaft related to its swing between two points guided by parallel slides.

The presented system has the advantage of producing very little torque on the control shaft, which is ultimately the helm in the case of a ship, which allows it to be released during operation, for example, without affecting the orientation.

The function of the orienter system as previously defined is also operational without flapping movement. Thus, in the case of a T-configuration, the flapping system equipped with the system S7 orienting the bit of the foil in a plane (x,y) is directly transformed into a passive rudder, the latter being additionally laterally movable, which can be an advantage, for example for ships listing like a sailing boat.

For the H-shaped configuration, the person skilled in the art can provide an additional orientation in the plane (x, z) by mounting the entire device on a turntable. Thus, either by adopting a partially profile rammer on a certain surface, or by modifying the foil by adding a more or less perpendicular plane part, such as a winglet or a wingtip fence, the system can fulfil this function of directional orientation in the plane (x, z).

Elementary Configurations

The flapping drive device for a foil according to the invention allows a number of elementary configurations from the generic so-called T-shaped and H-shaped configurations set forth and from the functional systems producing, adjusting and orienting the flapping as described above, and this with simplicity and compactness of the device.

Thus, it is possible to obtain a so-called basic configuration denoted as To with a pure transverse motion of heave, starting from the generic T-configuration, that is, in the case where the transverse motion of the bit of the foil is linear, composed only of a movement $\Sigma$ and that this is orthogonal to u. The interest of this configuration To is its simplicity.

From the basic configuration To with a foil orthogonal to the plane (o;x,y), a configuration offsetting the foil of the wall along x with the installation of an arm holding its tilt axis, can be contemplated. This configuration, denoted as Tb, is called flapping. The interest of this configuration lies in this offset enabling the arm to be placed on the rear part of a machine.

Still from the basic configuration To with a foil substantially orthogonal to the plane (o;x,y), a configuration progressively changing the heave of the sections of the foil according to their distance from the wall can also be contemplated. The most obvious configuration is that which produces only a rolling swing of the foil, of angle $\Psi$, from a pivot point which is physically part of the system or the machine. This configuration will be referred to as the wing configuration and denoted as Ta. In the case where the system is doubled in a mirror image, there is a device looking like flapping wings or pectoral fins. In addition to the potential related to biomimicry, the interest of this configuration is the possibility of effective sealing between the wall of the device and the foil or its bit via the installation of a bellows, the slot being able to be very reduced or replaced by a ball and socket joint or equivalent.

Another possible configuration in this context is that producing a heave motion superimposed on a roll swing. This case is in fact equivalent to a roll configuration where the pivot is fictitious and outside the system, this point additionally moving due to the fact that the bit is carried without movement by a linear slide. This configuration, denoted as $T_{O}$, is called oscillating. The interest of this configuration is an oscillating transverse movement with a fictitious distant pivot.

Starting from the generic H configuration, in the case where the transverse movement of the bit is comprised of a movement $\Sigma$ orthogonal to u, the configuration is called moving as a piston and denoted as Ho. The interest of this configuration is multiple: the orientation of the mechanism according to the movement $\sigma$ can be achieved according to the longitudinal or transverse direction or for any intermediate direction; the sealing between the mechanical and hydrodynamic parts can be efficiently achieved based on fine adjustments of the parts and/or seals; a double possibility of orientation of the foil is possible along the axes z and y.

In these configurations, it is possible to introduce a transverse motion inducing a surge.

Thus, in the so-called flapping configuration, denoted as Tb, the arm carrying the foil moves while remaining parallel in its positions; however, in order to produce the heave of the foil, it is possible to contemplate a transformation of this configuration consisting in tilting the arm rather than moving it in parallel for the heave. The transverse motion is then not strictly heaving but in an arc of a circle, thus providing a surge component. This configuration, by analogy with the caudal fin of fish and marine mammals, is called caudal and denoted as Tc. The advantages of this configuration lie in the possibility of effective sealing between the mechanical part and the hydrodynamic part and in its positioning like a caudal fin.

In the basic configuration To, including its variations with a roll tilt (Ta and $T_\Omega$), the transverse heave motion $\Sigma$ or swing motion $\Psi$ is strictly orthogonal to the relative velocity of the fluid with respect to the machine, that is, the velocity u. Nevertheless, it is of course possible to arrange the installation of the device in the machine or on its support so that the transverse motion is not strictly orthogonal to u, or is inclined by an angle that will be named $\xi$, different from 90°. These configurations will be denoted as To', Ta', $T_\Omega$' for those deriving respectively from To, Ta, $T_\Omega$.

Likewise, the so-called moving as a piston configuration Ho can be installed in such a way that the heave is not strictly orthogonal to u, that is, with a bias $\xi$. The configuration Ho with this bias will be denoted as Ho'. Actually, this inclination $\xi$ of the transverse motion $\Sigma$ introduces a surge component, which is proportional to it. If the transverse motion is comprised of a swing $\Psi$, a yaw swing component is introduced, which is the composition of a surge and a sheer.

Hydrodynamically a surge component will directly impact the shape of the trajectory $\rho$ of the axis of the foil in the fluid. In order to measure such a surge effect, the trajectories of different typologies possible with the present invention are presented in FIGS. 21-A, 21-B, 21-C and 21-D, for different Strouhal numbers St (St=a.f/u with a the amplitude and f the frequency of the flapping, u the relative velocity of the fluid) and for a heave of sinusoidal nature. Thus, St=∞ (or u=0) in FIG. 21-A, St=1.00 in FIG. 21-B, St=0.50 in FIG. 21-C, St=0.25 in FIG. 21-D; type A linear without bias ($\xi$=0); type B linear with a bias $\xi$ of 30°; type C with an arm of 1.41 m swinging at +/−45°.

For comparison, trajectories are also given from transverse motions of fins on rotor, continuously rotating in the heave-surge plane as for the systems known as Von Schneider, Lipp or systems derived from them. This constitutes type D in the previous figures with a circular motion of radius 1.00 m. In all cases the heave function is purely sinusoidal with frequency f=1.00 and amplitude a=2.00 m.

The cases of the systems on rotors stand out clearly because of their strong dissymmetry with respect to the abscissa axis with a clear stirring effect above a Strouhal number of 1/2.

However, since the working incidence $\alpha$ of the profiles of a foil has a restricted optimal value range around 10-20° and this incidence $\alpha$ is the angle between the pitch $\phi$ produced by the system and the angle of the trajectory $\theta$, the shape of the trajectory defines the ideal pitch function to achieve the optimal efficiency.

The change of this trajectory angle, over one period, for the different systems is shown in FIG. 22 representing the slope $\theta$ of the trajectory $\mu$ of the axis of a foil for different Strouhal numbers St and different types of transverse motion. It appears therefrom that, except for the strictly perpendicular transverse case, the ideal pitch functions to be generated are quickly complex when the surge component is large, the rotor case being particularly problematic, which in its applications affects the yields.

Nevertheless, the case of the inclination of the transverse motion (case B or C) is not without interest and in fact it is found in animals, which is not accidental. Indeed, in this case, it is noticed that the trajectory $\mu$ clearly includes two phases corresponding respectively to the equivalent of the falling off and the ascent of the plane. However, within the context of a change subject to a gravity field, the lift in the direction opposite to this field has to be greater than in the other direction in return for benefiting from the extra power provided by the weight; whereas the ascent phase can be reduced to a glide. Moreover, it is reported that the efficiency of a system with this asymmetry can be equivalent to that of symmetrical trajectories according to for example S. C. Lich & Al [S. C. Licht, M. S. Wibawa, F. S. Hover, M. S. Triantafyllou; Journal of Experimental Biology; In-line motion causes high thrust and efficiency in flapping foils that use power downstroke; 2010 213: 63-71; doi: 10.1242/jeb.031708]. However, this possibility requires an adapted pitch function on each of the half-periods that the mechanism of the invention allows by playing on the function $\Phi$ of the helical path of the system S2 or/and $\lambda$ of the crankpin produced by the system S1.

Configurations with Several Foils

The flapping drive device according to the invention, according to one or other of the elementary configurations set forth above, allows the skilled person to contemplate configurations with several foils whose transverse motions are substantially synchronised without departing from the spirit and scope of the invention, the device producing the fundamental kinematic components, the assembly of the systems S1, S2 and S3, being the same and the transmission system S4 being sometimes to be adapted. It goes without saying that this multiplication of foils for a same flapping system further increases the interest of the invention.

Remarkable Qualities of the Invention

Whatever the variation of the flapping chosen to be adapted to the targeted application, and in addition to the various possible configurations, the invention stands out in relation to existing or described flapping foil systems in that it has the following generic qualities and properties:

The system is not very disturbing for the fluid. In particular, it includes no fixed elements in the fluid to guide the foil and the minimum of movable elements to position it, their dimensions being moreover normally small with respect to the surface area of the foil.

In particular, for submerged applications or applications in contact with the marine environment, half of the elementary configurations (Ta, Tc, Ho) allow sealing to be simple performed between the hydrodynamic part and the mechanical part, for example by means of a seal or bellows.

The system can produce a flapping that is exclusively transverse to the axis of advance of the machine, that is, in particular without any surge movement that introduces a dissymmetry in the trajectory of advance of the foil and, consequently, creates a dissymmetry of hydrodynamic operation that is detrimental to performance. Tilting arm fins are concerned by these asymmetry problems, but the advantage of the system is that it allows the pitch function to be adjusted to this functional asymmetry, which can cancel out the consequences, or even have advantages.

The kinematic chain producing the alternating flapping of the foil results, in reverse use, in a continuous rotary motion allowing the use or operation of traditional rotating machines (engine, dynamo, pump, etc.); the inversion of the direction of rotation of the rotating machine is moreover equivalent to a phase shift of half a period of the kinematic or hydrodynamic parameters and in particular of the lift.

The kinematics of the flapping is of the sinusoidal or substantially sinusoidal type, a linear part being possible between vertices in one embodiment. The pitch of the foil generated during the flapping can nevertheless be shaped in the design with respect to its basic sinusoidal change, for example by approaching a more bulging signal to improve performance as reported by Boudis et al [A. Boudis, A. Benzaoui, H. Oualli, O. Guerril, M. Mekadem; 4ème Séminaire International sur les Energies Nouvelles et Renouvelables; Investigation Numérique de L'Extraction de L'Energie par une Aile Oscillante Ghardaïa-Algeria-24-25 Oct. 2016].

The device, including its steering modules, is entirely mechanical and without an actuator (no actuator or complementary electrical system or motor) which makes it simple and reliable. Adjustments are conventionally made by rotating control axes and the same angular position leads to the same adjustment.

The rotating motor source producing or exploiting the flapping is not located in the centre of the system but at any position on the periphery, which facilitates its maintenance, protection or exploitation.

The mechanism is relatively compact and basically flat, that is, the flapping is generated by a device occupying a limited space in the machine or the casing containing it. This compactness in a casing will allow isolation, packaging, transport. In addition, the overall size along σ is centred on the median or axial position of the transverse motion of the profile wing (foil), which makes it easy to place the system.

An alternative, consisting in performing a mirror coupling of two identical flapping mechanisms in the depth direction, is possible in most cases (for the embodiments shown, if the support does not tilt). This provides a possibility of force division, balancing and reduction of the bending of the pivot axes.

A speed control module can be added to the mechanism without deteriorating the operation or hydrodynamics of the wing. This module will allow the pitch angle of a foil to be varied in proportion to its nominal value, even to the point of cancellation if necessary. This will therefore allow the optimisation of the operation at a given speed (search for the optimum efficiency) but will also allow the acceleration or deceleration of the machine, or even its braking (thrust reversal), while the velocity of rotation of the driving source may remain unchanged.

A directional steering module can be added to the mechanism, comprising the speed control, without deteriorating its operation or hydrodynamics. This module will then allow the direction of the overall lift produced during the flapping (resultant of the lift over a cycle) to be varied with the ship's helm or its equivalent in relation to the direction of advance. In the case of an H-shaped configuration with a substantially vertical rammer, this directional steering module will then allow the machine to be oriented according to depth (elevator), which will complete the manoeuvrability of submerged type machine or allow trim corrections for floating machine. In addition, this orienter module is effective when the flapping is stopped and thus the foil can take on the function of a passive directional plane (rudder). This will also contribute to the performance of the machine as the propulsion unit and the rudder will be one and the same, cancelling out possible harmful hydrodynamic interactions between separate appendages. This possible orientation of the plane, even at standstill, may also allow the flapping wing to act as a passive lifting foil. For the H-shaped configuration mounted to a turntable, the profiling of the rammer or the winglet or wingtip fence type extensions of the foil has to be provided to play this role of passive rudder.

BRIEF DESCRIPTION OF THE FIGURES

The invention will now be described in more detail with reference to the figures, which represent:

FIG. 1-A a perspective view of a foil fitted on a machine with a generic so-called T-shaped configuration;

FIG. 1-B a perspective view of a foil fitted on a machine with a generic so-called H-shaped configuration;

FIG. 2-A a perspective view of a foil on which motions as used in navy or aviation are represented for the generic so-called T-shaped configuration;

FIG. 2-B a perspective view of a foil on which motions as used in navy or aviation are represented for the generic so-called H configuration;

FIG. 3-A a perspective view of a foil of a first embodiment of a flapping drive device for a foil according to the invention, according to the so-called basic configuration To, with the representation of the motions produced;

FIG. 3-B a perspective view of a foil of a second embodiment of a flapping drive device for a foil according to the invention, according to the so-called flapping configuration Tb, with the representation of the motions produced;

FIG. 3-C a perspective view of a foil of a third embodiment of a flapping drive device for a foil according to the invention according to a so-called wing configuration Ta, with the representation of the motions produced;

FIG. 3-D a perspective view of a foil of a fourth mode of a flapping drive device for a foil according to the invention according to a so-called oscillating configuration $T_\Omega$, with the representation of the motions produced;

FIG. 4-A a perspective view of a foil of the first embodiment of a flapping drive device for a foil according to the invention, with a surge component related to the introduction of a bias $\xi$ on $\Sigma$, that is, the configuration To', with its motions;

FIG. 4-B a perspective view of a foil of a fifth embodiment of a flapping drive device for a foil according to the invention, inducing a surge component, that is, the so-called caudal configuration Tc, with the representation of the motions produced;

FIG. 4-C a perspective view of a foil of the third embodiment of a flapping drive device for a foil according to the invention configured with a surge component related to the introduction of a bias $\xi$ on the pivot axis of $\Psi$, that is, the configuration Ta', with its motions;

FIG. 4-D a perspective view of a foil of the fourth embodiment of a flapping drive device for a foil according to the invention with a surge component related to the introduction of a bias $\xi$ on $\Sigma$ and on the pivot axis of $\Psi$, that is, the configuration $T_\Omega$, with its motions;

FIG. 5-A a perspective view of a foil of a sixth embodiment of a flapping drive device for a foil according to the invention in a so-called moving as a piston configuration Ho, with the representation of the motions produced;

FIG. 5-B a perspective view of a foil of the sixth embodiment configured with a surge component related to the introduction of a bias $\xi$ on $\Sigma$, that is, the Ho' configuration, with its movements;

FIG. 6-A a perspective view of a first embodiment of the fundamental drive device (S1, S2, S3) according to the invention;

FIG. 6-B a perspective view of a second embodiment of the fundamental drive device (S1, S2, S3) according to the invention;

FIG. 7 a perspective view of a first example embodiment of the first system S1 of the device of the invention, namely S1c;

FIG. 8 a perspective view of a second example embodiment of the first system S1 of the device of the invention, namely S1hypo;

FIG. 9-A a perspective view of a third example embodiment of the first system S1 of the device of the invention, namely S1epi-c;

FIG. 9-B a perspective view of a fourth example embodiment of the first system S1 of the device of the invention, namely S1epi-e.

FIG. 10 a perspective view of a complete flapping drive device (S1, S2, S3 and S4) for a foil with a basic configuration To with the version S1epi-c and equipped with the assistance option S5syn;

FIG. 11-A a perspective view of an example of the systems S2, S3 and S4 of a flapping drive device for a foil with a standard elementary wing configuration Ta;

FIG. 11-B a perspective view of another example of the systems S2, S3 and S4 with the option S5syn of a drive device with a standard elementary wing configuration Ta;

FIG. 12 a perspective view of an example of the systems S2, S3, S4 and S5asyn of a drive device with a standard elementary oscillating configuration $T_\Omega$;

FIG. 13 a perspective view of an example of the systems S2, S3 and S4 with the option S5syn of a drive device with a standard elementary so-called flapping configuration, Tb;

FIG. 14 a perspective view of an example of the systems S2, S3 and S4 of a drive device with a standard elementary configuration called caudal, Tc;

FIG. 15 a perspective view of an example of the systems S2, S3 and S4 with the option S5syn of a drive device with a standard elementary so-called moving as a piston configuration, Ho;

FIG. 16 a perspective view of a speed control system S6 in the case where the system S1 is a chain or belt with pulleys or pinions, namely S6/S1c.

FIG. 17-A A perspective view of a speed control system S6 in the case where S1 is simply a wheel, namely S6/S1m, FIG. 17-B a plan view of FIG. 17A;

FIG. 18-A a perspective view of a speed control system S6 in the case where the system S1 is a planetary gear train, namely S6/S1epi-c, FIG. 18-B a plan view of FIG. 18-A.

FIG. 19-A a perspective view of a speed control system S6 in the case where system S1 is an alternative planetary gear train S6/S1epi-e;

FIG. 19-B a plan view of FIG. 19-A;

FIG. 20-A a perspective view of an orienter system S7 allowing pitch orientation (a controlled phase shift) of the flapping of the foil;

FIG. 20-B a perspective view of an orienter system S7 allowing a pitch orientation (a controlled phase shift) of the flapping of the foil, in which the primary shaft swings through an angle γ;

FIG. 21-A;
FIG. 21-B;
FIG. 21-C;
FIG. 21-D; different trajectories µ of the axis of a foil for different Strouhal numbers St and different types of transverse motion:
FIG. 22-A;
FIG. 22-B;
FIG. 22-C;

FIG. 22-D the slope θ of the trajectory µ of the axis of a foil for different Strouhal numbers St and different types of transverse motion:

GENERIC PRESENTATION

According to a first type of possible configuration of a foil on a machine as illustrated in FIG. 1-A, the profile foil such as a profile wing 1 extends with its longitudinal axis substantially orthogonal to the wall 3 of the machine or of the frame on which it is assembled, the transverse motion of said foil 1 being substantially tangential to this wall 3, knowing that the wall 3 is defined here as part of the physical envelope of the machine or of the casing which contains the drive device according to the invention. This generic configuration is called T-shaped. In the case represented, the profile wing 1 is attached to the flapping drive device by the axis about which it can tilt, referred to as bit 2 fitted on the profile of the profile wing 1 and it undergoes a transverse movement. The bit 2 passes through a slot 4 provided in the wall 3 of the machine.

In a second type of configuration of a foil on a machine as represented in FIG. 1-B, the foil 1 has its longitudinal axis substantially parallel to the wall 3 and the transverse motion is then substantially normal to it. This generic configuration is called H configuration and includes two foils 1, 1'. In this case, the foil 1, 1' is attached to the flapping drive device according to the invention by, on the one hand, its tilt axis, namely the bit 2, 2' and, on the other hand, by at least one element preferably orthogonal to this axis and carrying the same without movement, called the rammer 5. The latter is then substantially normal to the wall of the machine 3 and can pass through it, through an opening fitted with a bearing with a bushing and a seal or equivalent, ensuring guidance and sealing between the mechanical parts, of the drive device, and the hydrodynamic parts, of the foil.

The functional systems S1, S2, S3 and S4 constituting the flapping drive device according to the invention produce, control and orientate the flapping with a simplicity and compactness allowing a number of elementary configurations, starting from the generic so-called T-shaped and H-shaped configurations, of which various variations are described in more detail hereafter.

Thus, the invention provides a flapping drive device for a foil such as a profile wing 1 according to a preferred embodiment for various alternatives and configurations. To this end, the following parts are distinguished in accordance with the preceding presentations: the so-called fundamental flapping drive device which makes it possible to produce both the transverse movement of a shaft σ and its reciprocating tilt which is called heel φ which, when directly applied to the bit 2 of a foil 1 are likely to produce the heave motion Σ and the pitch tilt φ respectively. Such a so-called fundamental drive device comprises the systems S1, S2 and S3 with different alternatives especially for the system S1.

The system S4 allows at least the essential movements of heave and pitch tilt to be transmitted to the foil and is also described as allowing, from the fundamental flapping drive device, the different elementary flapping configurations of a profile wing 1 to be obtained. Thus, the slide assist system S5 which can be fitted to certain configurations is detailed, as well as the systems S6 and S7 which allow a steering to be integrated to these configurations for the speed control and/or directional orientation steering.

The device according to the invention thus consists of a combined device for movably and pivotably driving a primary shaft constituting the so-called fundamental device.

The fundamental device is characterised, as illustrated in FIGS. 6-A and 6-B, in that the flapping of the foil is essentially produced, directly or indirectly, by the cooperation of three mechanical systems: S1, S2 and S3, whose compositions and assembly as described below form the device for transversely movably and reciprocatingly pivotably driving a primary shaft 200.

Fundamental System

The system S1 is dedicated to the cyclic motion, preferably continuous, of a point element or a set of elements equivalent in function, constituting a control member intended to cooperate with the other two systems S2 and S3, called crankpin 100. This crankpin 100 is most simply constituted by a pin or cylindrical journal, the lower base of which, called the foot, is fitted substantially orthogonally on the flank of a movable element 101, 103, 104 or 110 according to the alternatives, driving it along a generally planar trajectory λ, in the form of a curve closed on itself. This curve is preferably convex with an axial or even central symmetry of centre o, in the form of a circle, an ellipse or an oblong shape.

Such a trajectory λ therefore consists of a closed curve with a major axis and a minor axis intersecting at right angles in the centre o. This trajectory λ can then be broken down by projection in the plane into two combined periodic movement components intersecting at o perpendicularly, which will be called a along the major axis and τ along the minor axis, preferably linear (in the plane) and alternating (in time) around a mean value of zero if o is the barycentre of λ, and phase-shifted by a quarter turn. Several types of mechanism and embodiments of this system S1 are possible as described hereafter.

The system S2 is configured to use the movement of the control member or crankpin 100 along its component τ, the head of the crankpin 100 being engaged preferably on a helical path 201 normally, with an axis substantially the same as that of the primary shaft which it rotatably drives directly or indirectly, the function Φ of transformation of τ into φ being linear or not. This axis extends moreover in a plane preferably parallel to that of the trajectory λ and is, itself or its median position in the case where said primary shaft exhibits in this planar an additional reciprocating swinging motion γ, preferably parallel to the component τ.

Thus, the system S2 consists of means for pivotably driving a primary shaft 200 about its longitudinal axis, producing an alternating heel tilt φ of said primary shaft 200. This pivotal drive means preferably consist of a drum cam coaxial with the primary shaft, having a groove forming a helical path 201 into which the head of the crankpin 100 is engaged. This drum cam therefore normally consists of a cylinder or sleeve 202, having the helical groove 201, engaged onto the primary shaft 200.

The system S3 is dedicated to the minimum structural guidance of the motion components produced by the systems S1 and S2 in order to allow the transmission of said movement σ and heel tilt φ motions to the primary shaft 200, at a point of its axis, in the presence or not at this point of an additional swing γ.

Indeed, the system S3 comprises a support 300 on which the primary shaft 200 is mounted, freely rotatable on itself. The support 300 consists of a normally planar base and two sides substantially at the ends of the base extending more or less perpendicular thereto and preferably provided with two bearings 304, 304' between which the primary shaft 200 extends, rotatably drivable on itself, said primary shaft 200 and the planar base therefore extending preferably, but not exclusively in parallel planes.

The support 300 is furthermore guided by a means in its transverse movement which extends generally in parallel to the major axis of the component σ in a plane parallel to the plane of the trajectory λ. The support 300 is thus slidably mounted along an elongated member such as a slide 301 which constitutes this preferred guide means. The support 300 then has a ram 302 cooperating with the slide 301.

The base of the support 300 further includes means for guiding the control member of the system S1, consisting of a through slot 305 through which the crankpin 100 is engaged.

Thus, the crankpin 100 passes through said base of the support through the generally oblong slot 305, or an equivalent device, of direction and length at least equivalent to the maximum component τ of the trajectory λ of the crankpin 100 and adjusted in the width direction normally to the diameter of the crankpin 100.

To enable the cooperation of the systems S1, S2 and S3, these are superimposed in planes that are preferably, for the compactness of the system, parallel, such that the crankpin 100 is driven along the trajectory λ defined in a plane P1, cooperates with the support 300 by passing through the slot 305 of the support 300 in a plane P2 and is then engaged into the helical path connected to the primary shaft 200 located in a plane P3.

Thus, when the crankpin 100 is translatably driven along the trajectory λ, the component τ of this trajectory causes the crankpin 100 to be movably driven in the helical path 201 and in the slot 305, whereas the component σ causes said crankpin 100 to be brought into abutment against the longitudinal edges of the slot 305, which generates the movement of the support 300 along the slide 301.

The head of the crankpin 100 after passing through the slot 305 is engaged into the helical groove 201, and abuts against the edge of the groove along the movement component τ of the crankpin 100 causing the primary shaft 200 carrying the groove 201 to be rotatably driven.

The positions of the support 300 are either always parallel to each other, hence γ zero, as can be seen in FIG. 6-A, the ram 302 and the support 300 being fixed with respect to each other; or they form a variable angle γ with each other, as in FIG. 6-B, with in this case the installation of an axis pivot 303 for the connection of the ram 302 to the support 300. The pivot 303 is preferably mounted to the intersection of the orthogonal projection of a and the axis of the helical path on a face of the support opposite to its base while the primary shaft and the helical path are in an intermediate position.

Thus, the motions σ and φ of the primary shaft 200 can be transmitted to the foil 1 when the primary shaft 200 is connected to the bit 2 via an additional system S4, the constitution of which is dependent on the presence or absence of the swings γ and Ψ and on the relative position of the foil 1 and the fundamental drive device. The system S4 thus transforms in particular the movement motion σ of the primary shaft 200 into Σ or Ψ or into Σ and Ψ and its heel swing φ becomes the pitching swing φ.

Based on this definition, different alternatives for the embodiment of the system S1 are possible to obtain a trajectory λ of the crankpin 100 from an original moving, generating or functional rotation such as a motor, generator, or even a pump, hereinafter named rotating machine.

As illustrated in FIG. 7, the drive means to which the crankpin 100 is fitted to achieve the trajectory λ consist of a flexible element such as a roller chain 110 or equivalent, or a series of parallel chains, moving at a substantially constant velocity $\bar{\omega}$ on rectilinear sections between at least two pinions or 2 sets of coplanar pinions 111a to 111f per chain, at least one of the pinions of which is, directly or indirectly, actuated by a motor or transmits its rotation to a generator, the trajectory λ consequently having linear sections between the generally circular pinions.

As illustrated in FIG. 8, the drive means for the crankpin 100 comprise, as a movable element to which the crankpin 100 is fitted in order to achieve its said trajectory λ, a planet gear 103 of a hypotrochoidal train or an extension 104 integral with this said planet gear, the latter rolling without sliding, generally via a gear, inside a planetary ring 102 which is fixed in position and generally in rotation, the diameter of the planet gear being half the diameter of the sun gear and the planet gear being held in its rotation by a pivot 105 in its centre fitted to a driving wheel 101 or a crank of substantially constant velocity of rotation ω, directly or indirectly related to said rotating machine, the trajectory λ being consequently here an ellipse of centre o or a segment in the case where the orthogonal projection of the axis of the crankpin 100 is on the perimeter of the planet gear, that is on the orthogonal projection of the primitive radius in the case of a toothed wheel.

As illustrated in FIGS. 9-A and 9-B, the movable element to which the crankpin 100 is fitted in order to achieve its said trajectory λ is a planet gear 103, or an extension 104 integral therewith, which belongs to an anti-epitrochoidal train with gears or toothed pulleys and pinions, defined on the one hand, in that said planet gear gravitates (rotates at a distance) generally in the same plane around a planetary gear wheel 102 which is fixed in position and ordinarily rotatably fixed by being secured to a support axis 112, due to its being held by a pivot 105 in its centre on a driving wheel 101 or a crank of substantially constant velocity of rotation ω around the support axis 112, located in a parallel plane, in direct or indirect connection with the rotating machine; whereas, on the other hand, the proper rotation of said planet gear about its pivot 105 is obtained either by gearing with at least one small planet gear 106, 106', also held by a pivot (pivot axis) 107, 107' in its centre fitted to said driving wheel 101, is geared to the sun gear and the planet gear, or by a toothed belt 108 or a chain tensioned between these same elements, thus becoming pulleys or pinions, with possibly one or more intermediate rollers 106 modifying the path of the belt or the chain; and that moreover, for the targeted application, the diameter of the planet gear is half as large as that of the sun gear, which results in a trajectory λ in the form of an ellipse of centre o or, in a particular parameterisation case, in the form of a segment normally allowing the pitching φ of the foil to be cancelled out at all points of its transverse movement.

For structural purposes, a number of optional elements may here also be introduced, such as a balancing mass on the driving wheel or support wheels around the driving wheel. Similarly, a first alternative of the subsystem consists in doubling especially the teeth of the planet gear and sun gear on either side of said driving wheel; a second alternative, which can be combined with the first, consists in doubling this assembly in a mirror image in order to hold the same crankpin, or two crankpins facing each other, in the centre; that is, at least three possible alternatives of the subsystem.

Concerning the connection/transmission system S4, only the so-called standard system S4 is described, this being defined in that it minimises the number of elements necessary to obtain the elementary configuration, bearing in mind that this may be inadequate for a configuration with several foils. In this same spirit of simplicity, only the embodiment of the elementary configurations is described in which the movements of the primary shaft 200 and the bit 2 are in the same plane for the configurations denoted as To, Ta and Thor substantially for Ho and for which the bit 2 is substantially normal to the plane of movement of the primary shaft 200 for the configurations Tb and Tc. Other elements may be added to these standard elementary configurations by a person skilled in the art to adapt them to a multi-foil configuration or to change the position of these foils without departing from the spirit and scope of the invention.

Basic Standard Configuration to

Thus, in FIG. 3-A, an elementary configuration is shown (embodiment of the device) with a pure transverse heave movement, starting from the generic T-configuration, that is, in the case where the transverse movement of the bit 2 is linear, composed only of a movement Σ and this is orthogonal to u, this so-called basic configuration being denoted as To. The interest of this configuration is its simplicity. The transmission system S4 in this configuration ensures a direct transmission of the motions of the primary shaft 200 to the bit 2, by securing, preferably along their axis, the primary shaft 200 with the bit 2, this securing can be achieved by plates 407 substantially normal to the axes and between which rubber cylinders or equivalent are positioned in order to attenuate vibrations, absorb shocks or to have an elasticity in the operation, as visible in FIG. 10.

Such a configuration having a transverse movement motion Σ, is achieved with the fundamental drive device represented in FIG. 6A in which the system S3 is configured so that the support 300 extends orthogonal to the slide 301. Such a system may also benefit from a slide assist system S5 in its synchronous version as shown in FIG. 10. In addition, for the robustness of the mechanism, it is advantageous that the transmission system S4 also includes a complementary slide 401, with its dedicated ram 402, to ensure the guiding of the support 300 along a with a ram 402, 302 on each slide 401, 301, the two slides 301, 401 being quite distant from each other. As can be seen, the system S1 is connected to a rotating machine 8 which when it is a motor generates the flapping of the foil and when it is a generator recovers the energy of the flapping of the foil 1.

Standard Wing Configuration Ta

FIG. 11-A represents the flapping drive device according to the invention consisting of the fundamental device S1, S2, S3 associated with a system S4 which includes a secondary shaft connection 410 or equivalent between the bit 2 and the frame 3 to which the device is fitted, so that the movement σ produces the roll swing Ψ. Thus, as represented in FIG. 3-C, the so-called standard wing configuration Ta, having a transverse motion with a roll swing of angle Ψ, is obtained.

The implementation of the roll swing Ψ is achieved in all cases with the system S4 comprising ball and socket joint connecting means such as a tilting pivot 408 or equivalent and slide connecting means such as a shaft slide 405 between said bit 2 and the primary shaft 200 allowing their rotational connection and relative movement. Indeed, to the swing Ψ the free rotation of the bit 2 has to be added for its pitching tilt φ. However, it is also necessary to ensure a relative movement with respect to the frame 3 in the reference frame R of an element due to the linearity of the movement σ in this reference frame and not its arc shape with respect to the pivot of said ball and socket joint 408.

Several embodiments are then possible including: a sliding of the pivot axis with respect to the frame; a sliding of the shaft with respect to the pivot or a sliding allowing the shaft to be extended. The standard configuration Ta favours this last solution insofar as it is the only one that does not lead to radial movement of the foil with respect to the frame reference R, this radial movement being potentially detrimental to the lift by increasing the induced drag.

The standard configuration Ta therefore preferably includes a shaft slide 405 along the axis of said bit 2 allowing its elongation, that is, a device of the splined shaft and corresponding grooved sleeve type. The latter can be installed between the bit 2 and the primary shaft 200 as in FIG. 11-A or between the primary shaft 200 and the cylinder of the helical path 201 if the bearings 304, 304bis on the support 300 allow a movement while freezing the axial position of the drum cam 202.

Two possible embodiments now relate to the direction of the support 300 carrying in particular the primary shaft 200 in the system S3. Indeed, either the support 300 follows the transverse roll swing Ψ, hence γ=Ψ, which then assumes that the choice of the connection to the guide ram 302 on the slide 301 is the axis pivot 303, or the support 300 remains orthogonal to the slide guide system 301. In the first case with a tilting support 300 (FIG. 11-A), the connection between the primary shaft 200 and the bit 2 is a simple shaft securing as in the configuration To of FIG. 10; in the second case with a support 300 remaining orthogonal to σ (FIG. 11-B), the connection is achieved with a shaft transmission joint 406 allowing the variation in angle Ψ while transmitting the heel rotation φ, but the slide 301 of the system S3 then has to prohibit on its own or via a complementary slide the rotation of the ram 302 around the slide 301 as indicated in the description.

The choice of either of the latter two possibilities changes the kinematic function Ξ of transformation of φ into φ. Due to the non-parallel position between the axis of the helical path 201 and the component τ in the case of a support 300 following the tilt Ψ, the designer will take into account that the heel function Φ defined on said helical cam path will be modulated with an dissymmetric wave function between the falling off and the ascent of the foil (or its motion to starboard and its motion to port). In addition, this dissymmetry will be moreover stronger as the component τ has a large clearance. In the case now of a support 300 remaining orthogonal to σ, it is taken into account that if a non-homokinetic shaft transmission joint 406 is adopted, the heel function defined on the helical cam path 201 is modulated with a wave function directly depending on the roll angle Ψ.

Standard Oscillating Configuration $T_\Omega$

To obtain the so-called standard oscillating configuration $T_\Omega$ having a transverse motion with a roll swing of angle Ψ superimposed on a movement Σ, illustrated in FIG. 3-D, the fundamental drive device S1 to S3 is associated with a system S4 which includes at least one complementary guide slide 401, and preferably a second one 401', parallel to and relatively spaced from that of S3 (see FIG. 12).

The simplest and most efficient way to obtain the configuration is as follows: the system S3 consists of a support 300 pivoting on the ram 302, via the axis pivot 303, As for the transmission system S4, it therefore includes two slides 401, 401', each of these complementary slides being fitted with a ram 402, 402' to drive, by a complementary pivot 403, 403', an independent complementary support 400, 400' which will carry for the first one the bit 2 of the foil without movement, via a dedicated bearing 404 and for the second, if necessary, the primary shaft 200, the supports 300, 400, 400' being aligned along the axis of the carried shafts, as well as a shaft slide 405 allowing a connection with relative movement between the primary shaft 200 and the bit 2, namely a device of the splined shaft and bit type and corresponding grooved sleeve; and if necessary, a bearing or equivalent 404 will allow the movement of the primary shaft 200 with respect to the second complementary support 400'. Finally, the mechanism will be completed by the slide assist system S5 driving at least two rams asynchronously, this asynchronism ensuring the roll swing Ψ of the bit 2 and γ of the support, with γ=Ψ.

Due to the tilt γ of the support, the axis of a helical path 201 and the component τ are non-parallel. As a consequence, it will be taken into account that, by construction, the heel function Φ defined on the helical path is modulated with a dissymmetric wave function between the falling off and the ascent of the foil (or its motion to starboard and its motion to port). In addition, this dissymmetry is moreover stronger as the component τ has a large clearance.

Configurations To, Ta', $T_\Omega$'

It is possible to introduce in these configurations To, Ta, $T_\Omega$ a transverse motion inducing surge. Thus, while in the basic configuration To, including its variations with a roll swing Ta and $T_\Omega$, the transverse heave Σ or tilt Ψ motion is strictly orthogonal to the relative velocity of the fluid with respect to the machine, that is, to the speed u, it is possible to organise the installation of the device in the machine or on its support so that the transverse motion is not strictly orthogonal to u, or that it is inclined by an angle that is called ξ different from 90°. These configurations To', Ta', $T_\Omega$' are respectively represented in FIGS. 4-A, 4-C and 4-D for those derived from To, Ta, $T_\Omega$ respectively.

Standard Flapping Configuration Tb

The combined flapping drive device for obtaining the so-called standard flapping configuration Tb, visible in FIG. 3-B, having a heave motion Σ with a foil offset along the axis x, comprises the fundamental drive device of the systems S1 to S3, and a system S4 as illustrated in FIG. 13, provided with the complementary slide 401 similar to that described above which also comprises a cylindrical or profile hollow arm 6, integral with the support 300 and orthogonal to the slides 301, 401, carrying without movement via bearings, on the one hand, preferably inside the arm 6, a secondary shaft 410 coaxial and integral on one side with the primary shaft 200 and on the other side with the bit 2 of the foil 1, the latter being substantially orthogonal to the shafts 200, 410, with two collaborating bevel toothed wheels 411 or equivalent integral, one with said secondary shaft 410 and the other with the bit 2) to ensure the transmission of the heel angle φ to the latter, as can be seen in FIG. 13. Moreover, the movement of the support 300 on the slides 301, 401 may include the slide guide system S5 in its synchronous version.

Standard Caudal Configuration Tc

In the so-called flapping configuration denoted as Tb, the arm 6 carrying the foil moves while remaining parallel in its positions; however, in order to produce the heave of the foil, a transformation of this configuration can be contemplated, consisting in tilting the arm rather than moving it in parallel to the heave. The transverse motion is then not strictly heaving but in the form of an arc of a circle, thus providing a surge component. This configuration, by analogy with that of the caudal fin of fish and marine mammals, is called caudal and denoted as Tc as visible in FIG. 4-B. Thus, starting from the fundamental device of the systems S1 to S3, the transmission system S4 is associated, which includes a hollow cylindrical or profile arm 6, integral with the support 300 and pivoting on the frame or machine 3 as represented in FIG. 14. The so-called standard caudal configuration Tc has a transverse pitching tilt motion Ψ with an offset foil, as illustrated in FIG. 4-B.

The simplest and most efficient embodiment of the configuration is as follows: the system S3 is configured with a pivoting support 300, via the axis pivot 303 according to the description of the subsystem; the system S4 comprises a generally hollow, cylindrical or profile arm 6, integral with said support 300, preferably carrying inside the arm, an integral secondary shaft 410 connected directly or indirectly on one side of the primary shaft 200 to form a same axis substantially parallel to said arm 6; on the other side of said arm carrying the bit 2 of the foil 1 substantially orthogonal to the shafts 200, 410, two collaborating bevel toothed wheels 411, one of which is integral with said secondary shaft 410 and the other with the bit 2, ensuring their connection. Thus, the transmission system S4 includes a hollow cylindrical or profile arm 6, integral with the support 300 and pivotably mounted with respect to the frame or the machine 3 so that the movement σ produces the pitch tilt Ψ by means of two opposite pivots 409 not passing through said arm 6; the primary shaft 200 extending inside the arm 6 and in its continuity a secondary shaft 410 being carried without movement via bearings inside the arm 6 by being parallel to it. On the one hand, the connection between the primary shaft 200 and the secondary shaft 410 positioned end-to-end along the same axis is achieved by means of sliding means allowing the relative movement of the shafts such as a shaft slide 405 allowing their relative movement, or a device of the splined shaft and corresponding grooved sleeve type; on the other side, at its end, the arm 6 carries without movement the bit 2 of the foil 1, the latter being substantially orthogonal to the secondary shaft 410; finally, two collaborating bevel toothed wheels 411 or equivalent are integral, one with the secondary shaft 410 and the other with the bit 2, in order to control the pitching φ of the latter.

Standard Moving as a Piston Configurations Ho and Ho'

The flapping drive device according to the invention making it possible to obtain the so-called standard moving as a piston configuration Ho having a transverse movement motion Σ with a foil offset along the axis y, as represented in FIG. 5-A, is that represented in FIG. 15.

The simplest and most efficient embodiment is the following: the system S3 is configured with a support 300 orthogonal to σ; the transmission system S4 including in turn, for the robustness of the mechanism, preferably a complementary slide 401 with its dedicated ram 402 to ensure the guiding of the support 300 along a with a ram 302, 402 on each slide 301, 401, the two slides being relatively distant from each other and also including a hollow cylindrical or profile rammer 5, positioned in parallel to the movement σ, integral with the support 300, mounted to said support 300 orthogonally to the primary shaft 200 and sliding in a liner 413 integral with the frame or the machine 3. The system further includes a secondary shaft 410 carried without movement preferably inside said rammer, parallel to it. The system S4 also includes a tertiary shaft 414, perpendicular to the primary shaft 200 and carried without movement by the support 300, the heel rotation φ of the primary shaft 200 being transmitted to the secondary shaft via the tertiary shaft by two collaborating bevel toothed wheels 415 for the perpendicular shafts or equivalent, additionally including, on the side of the support 300 a pair of generally spur wheels 417, 417', on two distant parallel shafts, one integral with the secondary shaft 410, the other with the tertiary shaft 414, allowing via a gear or a flexible transmission element such as a belt or a chain 416 the transmission of rotation between the secondary shaft 410 and the tertiary shaft 414. Finally, on the opposite side or foil side, the rammer 5 carries the bit 2 of the foil 1 without movement, the latter being substantially orthogonal to the rammer 5 with two collaborating bevel toothed wheels 411 or equivalent, one integral with the secondary shaft and the other with the bit to control the pitch φ of the latter.

It should be noted, however, that to the detriment of the symmetry of the device, an alternative of the device is possible by offsetting the rammer 5 with respect to the support 300, which makes it possible to do away with the tertiary shaft 414 and the pair of spur wheels 417, 417', the collaboration between the primary 200 and secondary 410 shafts then being able to take place directly via a pair of collaborating bevel gear wheels.

This so-called moving as a piston configuration Ho may be installed such that the heave is not strictly orthogonal to u, that is, with a bias. This configuration, denoted as Ho', is represented in FIG. 5-B. Actually, this bias ξ of the transverse motion Σ introduces, a surge component, which is proportional to it.

Complementary Systems

As already mentioned before, the system S4 transforms, from the fundamental device S1, S2 S3, the movement motion σ of the primary shaft 200 into Σ or Ψ or into Σ and Ψ and its heel tilt φ becomes the pitching tilt φ. Moreover, additional systems can extend the field of use or efficiency of a particular configuration as set forth below, such as the speed control system S6 or the directional orienter system S7, or structurally improve the configuration or fully complete its kinematics as with the slide guide system S5.

Slide Assist System

In the case of the presence of at least two slides 301 and 401 oriented along a, each guiding a ram 302, 402 to carry the primary shaft 200 on the support 300, a slide assist system, named S5, as illustrated in FIGS. 10, 11-B, 13, can be added. It is mandatory in FIG. 12 for the configuration T$_\Omega$ its asynchronous version.

The robust embodiment of this system consists in positioning on either side of at least two slides a pinion 500, 500' connected by a flexible transmission element 501, 501' such as a chain or a toothed belt taking up the ram of the slide by at least one attachment point 502, 502', such as a conveyance system. The pinions are then connected between the slides, at least on one side, by a connecting shaft 503, integral with each pinion, such that the movement of any element connected to a ram on a slide, leads via this system, to a movement on the ram of the other slide or other slides.

In the case where said connecting shaft 503 connects pinions 500, 500' of the same diameter (FIGS. 10, 11-B, 13), the movement at each slide is synchronous and the primary shaft 200 moves in positions parallel to each other. In order to limit the unwanted stresses on the rams 302, 402 and the slides, these will then preferably be connected to the support 300, for one with a pivot 303 and for the other with a sliding pivot 403, that is, a pivot inserted in an oblong hole allowing a slight clearance or an equivalent device.

In the case where the connecting shaft connects pinions of different diameters (FIG. 12), the movement of the rams will be asynchronous, which produces a swing of the primary shaft 200 that is only possible with the presence of at least one independent complementary support 400 (or two in FIG. 12 with 400 and 400'), the authorisation of a swing between the rams 302, 402, 402' and the supports, either via the pivot 303 and a complementary pivot 403, 403' per complementary support and finally, with a clearance to absorb the difference in distance related to the swing $\Psi$ between the two rams, either by connecting the shafts carried on each support positioned end-to-end along the same axis, in this case the primary shaft 200 and the bit 2, via a shaft slide 405 allowing their relative movement, that is, a device of the splined shaft type and corresponding grooved sleeve. Thus, the swing angle $\Psi$ is determined by the ratio of the diameters of the pinions connected to said connecting shaft 503 and by the amplitude of movement of any point of the elements carried via the rams.

Speed Control System S6 Version S1c

In the case of the embodiment of the system S1 generating a substantially oblong trajectory $\lambda$ with a roller chain 110, 110' or equivalent, a speed control system S6 comprises means configured to coordinately modify the position of pinions, at least 4 and preferably 6 pinions, 111a to 111f, so as to widen or narrow, preferably symmetrically with respect to the direction $\sigma$, the component $\tau$ of the trajectory $\lambda$ of the crankpin 100 on the chain 110, which can especially be obtained, as illustrated in FIG. 16, by:

1) a set of pantograph-type hinged bars 620 connecting the pinions, to a row of lozenges in which said six coplanar pinions 111a to 111f of at least one chain, and preferably two, are in the extension of the terminal hinges of the end lozenges;
2) a control device for the relative position of said pinions, of the jack 621 type with a threaded rod or equivalent, to move two opposite hinges of one of the lozenges of said pantograph closer or away from each other; finally
3) a tensioning device where at least one end bar, and preferably two, of the end lozenges can be adjusted in length via an automatic spring-loaded jack 622a to 622d or equivalent.

Moreover, this pantographic system is mounted to a partition 623, parallel to the plane of the pinions, integral with the frame or the machine 3 with one of its hinge pivots 624, preferably the central one, fixed to the partition 623 while the lateral axial pivots 625a to 625d, and at least for one of them, will slide on openings 626a to 626d or equivalent, allowing the clearance along the direction a.

Speed Control System S6 Version S1m

In the case of the embodiment of the system S1m generating a circular trajectory $\lambda$ with a wheel or crank, the speed control system S6, as illustrated in FIGS. 17-A and 17-B, comprises means for offsetting the radial position of the crankpin 100 on the flank of the driving wheel 101 and a moving wheel 604 on which it is directly or indirectly guided along a path on each wheel, during the rotation thereof by means of a controlled phase shifting device between the rotations of the driving wheel 101 and the moving wheel 604, especially by preferably installing a differential 800. It consists in: on the one hand, allowing the movement, by an adjustable value $\Delta$, of the radial position of the crankpin 100 on the flank of the driving wheel 101 to which it is fitted during the rotation of the latter, which is normally obtained by three sets of complementary elements, the first set being composed especially of said driving wheel 101 in the flank of which a path 601 or a slide is open substantially radially such that the crankpin 100, of an axis substantially orthogonal to the flank of the driving wheel 101, or a ram 602 to which it is fitted, can move freely in the plane of the wheel, in a range of positions corresponding to the setting of $\tau$ accepted by the subsystem S2; the second set comprising the crankpin 100 and an equivalent crankpin, called the counter-crankpin 600, of parallel axis, opposite to each other, preferably on the same axis, integrally connected together directly or via the radial positioning ram 602 located in the first set; the third set comprising a moving wheel 604, juxtaposed to said crankpin-carrying driving wheel equipped as above and sharing the same geometrical axis o or physical axis 112, on the flank of which a spiral path or slide 605 of centre o or equivalent is made, facing the possible positions of the counter-crankpin 600 for the purpose of leading the end of the latter, or a ram in which this end is fitted, in a part of this spiral path.

The system S6 also consists in introducing a controlled phase shift $\chi$ between the rotations of the driving wheel 101 and the moving wheel 604 by preferably installing a member known as a differential 800, in which: one of the sun gears, called the primary sun gear 803, is integral via a shaft 610 with a wheel, called the follower wheel 611, which is geared with one of the two driving wheels 101 or moving wheels 604 to be phase-shifted; the secondary sun gear 804 is mounted integrally with a second follower wheel 613 which is geared for half the width of its teeth on a so-called inverter wheel 615, which is itself geared for the other half width on the other wheel to be phase-shifted; and finally, in which the planet carrier 801, which is integral with a shaft 614 opposite to the two preceding ones, is directly connected to a control lever which may be manual. The characteristics of the wheels in these sets are normally as follows: the driving wheel 101 and the moving wheel 604 are of the same diameter; the two follower wheels 611, 613 and the inverter wheel 615 are of the same diameter; the two sun gears 803, 804 of the differential are also of the same diameter; and the planet gear(s) 802 on the planet carrier 801 are of any diameter.

Speed Control System S6 Version S1epi

In the case of the embodiment of the system S1 generating an elliptical trajectory $\lambda$ according to the embodiment with a so-called anti-epitrochoidal planetary gear train with a chain or belt S1epi-c (108, FIG. 18-A or B) or with a gear with a small planet gear (106, FIG. 19-A or B) S1epi-e, the speed control system S6 which is common to both versions comprises means for offsetting the radial position of the axis o' of the crankpin-carrying planet gear 103, which is fitted to and guided together, directly or indirectly, on the flank of the driving wheel 101 and of a moving wheel 604, via a path on each wheel, during the rotation of the latter, by means of a controlled phase-shifting device between the rotations of the driving wheel 101 and of the moving wheel 604, especially by preferably installing a differential 800, and consists in:

firstly, allowing the movement, by an adjustable value $\Delta$, of the radial position of the axis o' of the crankpin-carrying planet gear 103 fitted to the flank of the driving wheel 101, during the rotation of the latter, which is normally obtained by three sets of complementary elements:

the first set being comprised of said driving wheel on the flank of which a path 601 or a slide is open substantially radially such that the pivot 105 of the planet gear 103, substantially orthogonal to the flank of the driving wheel, or a ram 602 to which it is fitted, can move freely in the plane of the wheel and in a range of positions corresponding to the setting of r accepted by the system S2;

the second set comprising the pivot 105 of the planet gear and another parallel pivot 603, in the opposite position, called counter-pivot, integrally connected together directly or via the radial positioning ram 602 mentioned in the first set;

the third set comprising a counter-wheel, called moving wheel 604, juxtaposed to said planet gear-carrying driving wheel equipped as above and sharing the same axis o or 112, on the flank of which a spiral path or slide 605 of centre o or equivalent is made, facing the possible positions of said counter-pivot 603 of the planet gear for the purpose of generally leading the end thereof or a ram in which said end is fitted in a part of said spiral path.

Secondly, as with the version S6/S1*m* set forth above, the equipment consists in introducing a controlled phase shift χ between the rotations of the driving wheel 101 and the moving wheel 604, via the installation of a differential 800 controlling the follower wheels 611 and 613 and the inverter wheel 615.

In order to adjust to the setting position Δ of the planet gear 103, a suitable means for moving the position of the pivot 107, either of the rollers for the version S6/S1epi-c or of the small planet gear for the version S6/S1epi-e, is required, which characterises the third device.

For the version S6/S1epi-c, this third device is represented in FIGS. 18-A and 18-B. These means are characterised by the positioning of the pivot 107 of one or more rollers 106, 106' symmetrically with respect to the straight line (oo') on the flank of the driving wheel 101 to which these axes are fitted, which is normally obtained by three sets of complementary elements:

the first set is comprised of said driving wheel on the flank of which a main path or slide 606, 606' per roller is open such that the pivot 107, 107' of each said roller, substantially orthogonal to the flank of said driving wheel, or a dedicated ram 607, 607' to which it is fitted, can move in the plane of the wheel freely, in a range of positions allowing the tensioning of the belt or the chain whatever the setting position of the planet gear;

the second set comprises, for each roller, the pivot 107, 107' of said roller and another parallel pivot, in the opposite position, called the roller counter-pivot 608, 608', integrally connected together directly or via said positioning ram 607, 607' dedicated to it; and the third set consists in making on the flank of the moving wheel 604, for each complementary roller, a complementary path or slide 609, 609' which crosses the main path opposite the possible positions of each roller counter-pivot 608, 608' with the purpose of generally leading the end thereof, or a ram in which this end is fitted, in a part of the complementary path 609, 609'; the further interposition of a spring in a range of additional free movement of a pivot which may also contribute to the tensioning of the belt or chain 108.

FIGS. 19-A and 19-B show this third additional device for the version S6/S1epi-e. This device is characterised by the positioning of the pivot 107 of the small planet gear 106 in such a way that it always remains geared with the sun gear 102 and the planet gear 103, which is normally achieved by the following four sets of complementary elements: the first set is comprised of, especially, said driving wheel, on the flank of which for said pivot of the small planet gear, a main path or slide 606 is open such that the pivot of the small planet gear, substantially orthogonal to the flank of said driving wheel, or a dedicated ram 607 to which it is fitted, can move in the plane of the wheel freely, in a position range normally in the form of an arc of a circle centred in o; the second set comprises the pivot 107 of said small planet gear and another parallel pivot, in the opposite position, called small planet gear counter-pivot 608, integrally connected together directly or via said dedicated positioning ram 607; the third set consists in connecting together, by at least one connecting rod 627, in a plane parallel to that of the driving wheel, said small planet gear counter-pivot 608 and said planet gear counter-pivot 603; finally, the fourth set dedicated to the correction of the angular position of the planet gear as a function of its radial positioning 4, comprises a so-called control wheel 628, integral with said shaft of the control lever 614, actuating, by gear or flexible element, a correcting wheel 629 integral with the shaft 112 integrally connected to the sun gear 102 of the anti-epitrochoidal gear train, noting that the ratio of the radii of the control wheel 628 to that of the correcting wheel 629 will be equal to 2 times the ratio of the radii of the follower wheel 611 to that of the moving wheel 604.

The device S6 also accepts the following alternatives which may lead to safer operation: the first consists in juxtaposing two driving wheels on either side of the moving wheel; the second consists in juxtaposing two moving wheels on either side of the driving wheel; with in both cases a third follower wheel rotatably connected to the follower of the doubled wheel to drive the secondary drive or moving wheel.

Orienter System S7

The flapping drive device according to the invention may further include an orienter system S7, by phase-shifting of the pitch tilt.

The orienter system applicable to all configurations is intended to introduce an additional angle, denoted as β, adjustable from 0 to 360° during operation, to the heel tilt φ of the primary shaft 200. As illustrated in FIGS. 20-A and 20-B, three or four sets of elements contribute to make the steering effective.

The first set consists especially, on the one hand, of a hollow cylindrical shaft elongated as far as the bearings 304, 304' carrying the same without movement on the support 300 of the system S3, called the steering shaft 700, generally integrally connected to the helical cam path 201 along its axis, with an internal diameter allowing the passage of the primary shaft 200 and, if necessary, annular elements minimising friction and prohibiting the relative movements of these shafts (bushings or rollers) carried with the bearings 304, 304' of the support 300.

The second set of elements preferably comprises a set known as a differential 900, that is, a planetary gear train having a planet carrier 901 with planet gears 902 of the same diameter, orthogonal to the two parallel sun gears 903, 904 of the same diameter, the primary shaft 200 being integral with one of the two sun gears 903, the steering shaft 700 being integral with the second sun gear 904, the planet carrier 901 being integral with the third shaft, called the orienter shaft 701, carried without movement by the support 300 via preferably two bearings 702, 702', itself rotatably connected to a wheel, called the orienter wheel 703, which controls its rotation.

The third set of elements consists in allowing the manoeuvre of said orienter wheel in its movement motion σ and to do so, a simple solution is materialised: firstly, with a splined control shaft or equivalent of a fixed position, named control shaft 704 positioned in parallel to the movement σ and being able to substitute a slide 301, 401 of the system S3 or S4; secondly, with a set comprising a endless screw 705 gearing on said orienter wheel so that their axes are orthogonal, said endless screw sliding on said splined control shaft allowing the latter to be rotatably driven and; thirdly, to ensure the movement σ of the endless screw, with a substantially U-shaped element, referred to as a staple 706, having the wings of the U passing on either side of the endless screw 705 and possibly having said splined control shaft passing therethrough, while its base or any other part attached to it is driven by the movement of the support.

The fourth set defines the connection of the orienter wheel 703 with the orienter shaft 701 depending on whether the support 300 of the subsystem S3 swings by the angle γ or is orthogonal to the movement along σ. In the case where orthogonality is maintained (FIG. 20-A), said orienter wheel is simply integral with said orienter shaft and said staple is integral with the support. In the opposite case (FIG. 20-B), it will be necessary, firstly, to provide guiding for the orienter wheel 703 on the splined control shaft 704 so as to maintain the orthogonality of the axes of the geared wheels 703, 705 as well as the positional invariance of the plane containing the movement of the axis of the orienter wheel, which will be achieved by using the slide 401 and the ram 402 of the system S4 integral with the staple to support at least one bearing 702" carrying the orienter wheel in the right position and, secondly, to provide a connection between two parts of the orienter shaft to allow the swing γ of the part of the shaft connected to the support, which requires, on the one hand, a shaft slide 707 allowing the relative movement of the shaft parts thus connected and, on the other hand, a shaft transmission joint 708.

Thus, the fourth set of elements, depending on whether the support 300 has a swinging motion γ or not, sets the coupling conditions between orienter shaft 701 and orienter wheel 703 on the one hand and between staple 706 and support 300 on the other hand, namely: in the case without a swing by securing these elements, the orienter shaft being carried in this case entirely without movement by the support 300, and in the case with a swing γ of the support, the device firstly includes a orienter shaft in two parts with a first part carried fixed by the support 300, while the second part is connected to the first with a shaft slide 707 allowing relative axial movement of the connected shafts and, on the other hand, a shaft transmission joint 708 to allow free swinging γ of each part of said orienter shaft; and the device secondly secures said staple to a ram 402 of a slide 401 of the subsystem S4 to carry, orthogonally to the movement σ and without proper rotation, the second part of the orienter shaft 701, via another bearing 702ter, due to its conjugate guidance with the control shaft.

Targeted Applications

All of the above-described configurations of the flapping drive device for a foil are adapted to applications in the movement or propulsion of surface, submerged or flying machines of all sizes, in hydro or wind energy production or for the equipment of robots or drones; consequently, many applications can be made of them. Moreover, because of the clear functional differentiation of the various systems set forth and because of their respective simplicity, it is obvious that a certain number of variations in, additions to and modifications of the mechanisms can be made by a person skilled in the art without departing from the spirit and scope of the invention.

The invention claimed is:

1. A combined flapping drive device for a foil such as a wing, submerged in a fluid, provided with a drive shaft called a bit, wherein the device comprises at least one device for movably and pivotably driving a primary shaft about its longitudinal axis, comprising said primary shaft and three systems operating in cooperation,
   a first system comprising means for movably driving a control member along a trajectory λ in the form of a closed curve, having at least a first axial component τ and a second axial component σ,
   a second system comprising means for pivotably driving, of heel angle φ, said primary shaft about its longitudinal axis, configured to be actuated by the movement of said control member mainly along the axial component τ of the trajectory λ defined by the first system, according to a main function Φ(τ) fixing φ;
   a third system comprising means for movably driving the primary shaft, configured to be actuated by the movement of said control member along mainly the second axial component σ of the trajectory λ defined by the first system,
   said control member being configured to extend protrudingly from the plane of its trajectory λ or a projection thereof in that plane and to engage both the means for pivotably driving the primary shaft and the means for movably driving said primary shaft, the movement of the control member along the closed curve generating both a pivotal control σ in one direction and then in the opposite direction of the primary shaft about its longitudinal axis and the movement of the primary shaft in one direction and in the opposite direction,
   the device further comprising a connecting system provided between said driving device of the primary shaft and the bit of the foil for transmitting the combined movement and pivoting motions of the primary shaft to this bit.

2. The device according to claim 1, wherein the drive means of the first system consist of a flexible transmission member such as a belt, a chain, movably driven in a plane by at least two drive members such as pulleys, pinions, the transmission member carrying the control member such as a crankpin protruding above the plane of the trajectory, and as a result of which the trajectory λ is planar and a preferably oblong curve.

3. The device according to claim 1, wherein the drive means of the first system are a wheel or crank, or a series of parallel wheels and cranks, rotating at a substantially constant velocity ω about their central pivot and to which a control member such as a crankpin is fitted, and as a result of which the trajectory λ is a planar circle.

4. The device according to claim 1, wherein the drive means of the first system consist of a planetary gear train of the epicyclic, epitrochoidal or antiepitrochoidal type denoted as epi or hypocycloidal or hypotrochoidal denoted as hypo, located in a plane generally parallel to the plane of the trajectory of the control member, such as a crankpin, fitted to the flank of a planet gear or of an extension integral therewith, the axis of rotation (o') of which is positioned on the flank of a wheel or of a crank called a driving wheel, and as a result of which the trajectory λ is planar and a preferably elliptical curve.

5. The device according to claim 1, wherein the second system comprises means for pivotably driving the primary shaft about its longitudinal axis, mounted to an axis of rotation coaxial with the longitudinal axis of the primary shaft and provided with guide means configured to cooperate with the control member along a helical movement path about the longitudinal axis of the primary shaft, such as a cylinder provided with a groove forming the cam path of the control member such as a crankpin, the function Φ(τ) giving φ, being linear or not.

6. The device according to claim 1, wherein the means for movably driving the primary shaft of the third system comprise a support to which the primary shaft is mounted freely rotatable about its longitudinal axis, the support comprising guide means configured to cooperate with the control member and to allow it free movement along a trajectory of the control member substantially parallel to the longitudinal axis of the primary shaft and driving it along a trajectory substantially orthogonal to the longitudinal axis of the primary shaft due to a substantially linear guide means, such as an elongated element, along which the support is mounted to follow the guiding thereof.

7. The device according to claim 6, wherein the support at least consists of a base and two opposite sides more or less at the ends thereof which carry the primary shaft, this base being provided with guide means such as a slot, allowing both the geared engagement of the control member and its clearance along the slot along the component τ of the trajectory λ.

8. The device according to claim 6, wherein the elongated element of the third system is a slide which is preferably linear and extends substantially orthogonally to the primary shaft, the support being slidably or rollably mounted to this slide using a ram, the support being mounted to the ram, either fixed or pivoting, and being able to swing through an angle γ.

9. The device according to claim 6, wherein the connecting system comprises at least one slide with a dedicated ram, to which the support or a complementary support is mounted.

10. The device according to claim 6, wherein the connecting system comprises a slide assist system, consisting of a pinion positioned on either side of each of at least two slides of the third system and/or the connecting system, connected by a flexible transmission element such as a chain, a toothed belt taking up the ram of the slide by at least one attachment point, the pinions being connected between the slides, at least on one side, by a connecting shaft, integral with each pinion.

11. The device according to claim 1, wherein the connecting system is configured to directly connect the primary shaft to the axis of the foil.

12. The device according to claim 1, wherein the connecting system comprises ball and socket joint connecting means such as a tilting pivot and slide connecting means such as a shaft slide between said bit and the primary shaft allowing their rotational connection and relative movement.

13. The device according to claim 1, wherein the connecting system comprises a generally hollow, cylindrical or profile arm, integral with said support, preferably carrying inside the arm a secondary shaft integral with and connected directly or indirectly to one side of the primary shaft to form a same axis substantially parallel to said arm; on the other side of said arm carrying the bit of the foil substantially orthogonal to the shafts, two collaborating toothed bevel gear wheels, one of which is integral with said secondary shaft and the other with the bit, ensuring their connection.

14. The device according to claim 13, wherein the arm is pivotably mounted with respect to the frame or the machine by means of two opposite pivots, the secondary shaft being connected to the primary shaft, positioned along the same axis, via sliding means allowing the relative movement of the shafts.

15. The device according to claim 6, wherein the connecting system comprises: a preferably hollow, cylindrical or profile rammer, mounted to the support orthogonally to the primary shaft; a secondary shaft being generally carried inside said rammer; a tertiary shaft, perpendicular to the primary shaft and carried by the support;
the heel rotation φ of the primary shaft being transmitted to said secondary shaft, via the tertiary shaft, by two collaborating bevel gears for the perpendicular shafts and a pair of generally spur wheels allowing via a flexible transmission element the transmission of rotation between the secondary and tertiary shafts and, on the foil side, the rammer carrying without movement the bit of the foil, the latter being substantially orthogonal to it with two collaborating toothed bevel gear wheels, connecting their rotation, one integral with the secondary shaft and the other with the bit.

16. The device according to claim 1, wherein the device comprises a speed control system comprising means for controlling the range of heel angle φ transmitted via the connecting system to the range of working incidence α of the foil on its trajectory μ, said control means consisting of means for parametrically modifying the first system in order to modify the component τ of the trajectory λ of the control member acting mainly on the second system.

17. The device according to claim 16, wherein the drive means of the first system consist of a flexible transmission member such as a belt, a chain, movably driven in a plane by at least two drive members such as pulleys, pinions, the transmission member carrying the control member such as a crankpin protruding above the plane of the trajectory, and as a result of which the trajectory λ is planar and a preferably oblong curve, and
wherein the speed control system comprises means configured to modify in a coordinated manner the position of the pinions in order to widen or narrow, symmetrically, the component τ of the trajectory λ using especially a set of pantograph-type hinged bars connecting the pinions.

18. The device according to claim 16, wherein the drive means of the first system are a wheel or crank, or a series of parallel wheels and cranks, rotating at a substantially constant velocity ω about their central pivot and to which a control member such as a crankpin is fitted, and as a result of which the trajectory λ is a planar circle, and
wherein the speed control system comprises means for offsetting the radial position of the crankpin on the flank of the driving wheel and of a moving wheel on which it is directly or indirectly guided along a path on each wheel during the rotation thereof by means of a controlled phase-shifting device between the rotations of the driving wheel and the moving wheel by especially preferably installing a differential.

19. The device according to claim 16, wherein the drive means of the first system consist of a planetary gear train of the epicyclic, epitrochoidal or antiepitrochoidal type denoted as epi or hypocycloidal or hypotrochoidal denoted as hypo, located in a plane generally parallel to the plane of the trajectory of the control member, such as a crankpin, fitted to the flank of a planet gear or of an extension integral therewith, the axis of rotation (o') of which is positioned on the flank of a wheel or of a crank called a driving wheel, and as a result of which the trajectory λ is planar and a preferably elliptical curve, and
wherein the speed control system comprises means for offsetting the radial position of the axis o' of the crankpin-carrying planet gear, which is located and guided together, directly or indirectly, on the flank of the driving wheel and of a moving wheel, via a path on each wheel, during the rotation thereof, by means of a controlled phase-shifting device between the rotations of the driving wheel and of the moving wheel, especially by preferably installing a differential.

20. The device according to claim 6, wherein the device comprises an orienter system comprising:
a first set of elements consisting of a hollow cylindrical elongated shaft on said support, called a steering shaft, integrally connected to the helical cam path along its axis, of an internal diameter allowing the passage of the primary shaft, a second set of elements comprising a differential, consisting of a planetary gear train having a planet carrier with planet gears orthogonal to the two parallel sun gears of a same diameter, the primary shaft being integral with one of the two sun gears, the steering shaft being integral with the other sun gear, the planet carrier being integral with the third shaft, called the orienter shaft, rotatably connected to a wheel, called the orienter wheel, which controls its rotation, a third set of elements with a splined control shaft, of fixed position, also comprising a endless screw geared to the orienter wheel so that their axes are orthogonal, said endless screw sliding by its axis on said splined control shaft allowing the latter to be rotatably driven and; with a substantially U-shaped element, called a staple, having the wings of the U passing on either side of the endless screw and preferably having said splined control shaft passing therethrough, while its movement is dependent on the motions of the support, and a fourth set of elements, depending on whether the support has a swinging motion γ or not, sets the coupling conditions between the orienter shaft and the orienter wheel on the one hand and between the staple and the support on the other hand, namely: in the case without swinging by securing these elements, the orienter shaft being carried in this case in its entirety without movement by the support, and in the case with a swing γ of the support, the device firstly includes a orienter shaft in two parts with a first part carried fixed by the support, while the second part is connected to the first with a shaft slide allowing relative axial movement of the connected shafts and, on the other hand, a shaft transmission joint to allow free swinging γ of each part of said orienter shaft; and the device secondly secures said staple to a ram of a slide of the connecting system to carry, orthogonally to the movement o and without proper rotation, the second part of the orienter shaft, via another bearing, due to its conjugate guidance with the control shaft.

21. A device for movably and pivotably reciprocatingly driving a primary shaft about its longitudinal axis, wherein the device comprises a primary shaft and three co-operating systems, a first system comprising means for movably driving a control member along a trajectory λ in the form of a closed curve, having at least a first axial component τ and a second axial component σ, a second system comprising means for pivotably driving, of heel angle φ, said primary shaft about its longitudinal axis, configured to be actuated by the movement of said control member along at least one component of the trajectory defined by the first system;

a third system comprising means for movably driving the primary shaft, configured to be actuated by the movement of said control member along at least the other component of the trajectory defined by the first system, said control member being configured to extend protrudingly from the plane of said axial components of its trajectory λ or a projection thereof in a plane and to be in engagement with both the means for pivotably driving the primary shaft and the means for movably driving said primary shaft, the movement of the control member along the closed curve generating both a pivotal control φ in one direction and then in the opposite direction of the primary shaft about its longitudinal axis and the movement of the primary shaft in one direction and in the opposite direction.

* * * * *